(12) United States Patent
Nanbu

(10) Patent No.: US 7,974,473 B2
(45) Date of Patent: Jul. 5, 2011

(54) IMAGE PROCESSING METHOD AND IMAGE PROCESSING APPARATUS

(75) Inventor: Kyojiro Nanbu, Ohtawara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 676 days.

(21) Appl. No.: 12/055,110

(22) Filed: Mar. 25, 2008

(65) Prior Publication Data

US 2009/0080724 A1    Mar. 26, 2009

Related U.S. Application Data

(63) Continuation of application No. 10/680,256, filed on Oct. 8, 2003, now Pat. No. 7,492,947, which is a continuation of application No. PCT/JP01/03362, filed on Apr. 19, 2001.

(51) Int. Cl.
G06K 9/62 (2006.01)
G06K 9/68 (2006.01)

(52) U.S. Cl. ........ 382/209; 382/217; 382/218; 382/219; 382/220; 382/221

(58) Field of Classification Search .................. 382/209, 382/217, 218, 219, 220, 221, 222
See application file for complete search history.

(56) References Cited

U.S. PATENT DOCUMENTS

| | | | |
|---|---|---|---|
| 4,958,374 A * | 9/1990 | Tokita et al. ................. | 382/149 |
| 5,402,338 A | 3/1995 | Ito | |
| 5,602,934 A * | 2/1997 | Li et al. ......................... | 382/128 |
| 5,673,340 A * | 9/1997 | Kanda ........................... | 382/250 |
| 5,754,707 A | 5/1998 | Knowlton | |
| 5,917,960 A * | 6/1999 | Sugawa ........................ | 382/278 |
| 6,041,145 A | 3/2000 | Hayashi et al. | |
| 6,052,414 A * | 4/2000 | Lee et al. ................ | 375/240.16 |
| 6,067,371 A | 5/2000 | Gouge et al. | |
| 6,108,455 A | 8/2000 | Mancuso | |
| 6,195,450 B1 | 2/2001 | Qian et al. | |
| 6,360,019 B1 | 3/2002 | Chaddha | |
| 6,388,706 B1 * | 5/2002 | Takizawa et al. ............ | 348/273 |
| 6,952,484 B1 | 10/2005 | Higginbottom et al. | |
| 7,046,833 B2 | 5/2006 | Masumoto et al. | |
| 2002/0039438 A1 * | 4/2002 | Mori et al. .................... | 382/154 |

FOREIGN PATENT DOCUMENTS

| | | |
|---|---|---|
| EP | 0 961 224 A1 | 12/1999 |
| JP | 3-85683 | 4/1991 |
| JP | 3-102978 | 4/1991 |

(Continued)

OTHER PUBLICATIONS

Japanese Office Action issued Nov. 24, 2010, in Patent Application No. 2008-010897 (with English-language translation).

Primary Examiner — Brian Q Le
(74) Attorney, Agent, or Firm — Oblon, Spivak, McClelland, Maier & Neustadt, L.L.P.

(57) ABSTRACT

This invention consists in an image processing method in which the similarity between a first pixel and a second pixel constituting an image is numerically given by statistical testing, and the values of the first and second pixels are averaged when the similarity numerically given is high, whereas the first and second pixel values are not averaged when the determined similarity is low, whereby an image with noises suppressed is obtained without spoiling a spatial resolution as well as a temporal resolution.

13 Claims, 22 Drawing Sheets

FOREIGN PATENT DOCUMENTS

| | | |
|---|---|---|
| JP | 4-241839 | 8/1992 |
| JP | 7-170406 | 7/1995 |
| JP | 9-51890 | 2/1997 |
| JP | 10-79872 | 3/1998 |
| JP | 2000-50109 | 2/2000 |
| WO | WO 99/62249 | 12/1999 |

* cited by examiner

FIG. 1

| NULL HYPOTHESIS H | POSSIBILITY OF TRUTH OF NULL HYPOTHESIS H | SIMILARITY OR ABANDONING CRITICAL PROBABILITY p (x, y) | WEIGHT w (p (x, y)) |
|---|---|---|---|
| PIXEL VALUES v (x) = v (y) EXCEPT NOISES OF BOTH PIXELS | LARGE | HIGH | LARGE |
| | SMALL | LOW | SMALL |

FIG. 2

| RADIOGRAPHIC MEANS | | SUBJECT FOR AND PURPOSE OF RADIOGRAPHING | PURPOSE OF COHERENT FILTER | METHOD OF CONSTRUCTING v(x) |
|---|---|---|---|---|
| EQUIPMENT | RADIOGRAPHIC METHOD | | | |
| X-RAY CT | DYNAMIC CT | TO OBSERVE DYNAMIC CHANGE | TO REDUCE NOISES WITHOUT SPOILING SPATIAL AND TEMPORAL RESOLUTIONS | PIXEL VALUES $v_k(x)$ ARE CALCULATED FROM PLURALITY OF (k) IMAGES OF IDENTICAL PART |
| MRI | DYNAMIC MRI | DITTO | | |
| SPECT | DYNAMIC SPECT | DITTO | | |
| PET | DYNAMIC PET | DITTO | | |
| RADIOGRAPHY | FLUOROSCOPY | DITTO | | |
| X-RAY CT | PLURALITY OF TIMES OF RADIOGRAPHING | TO OBTAIN IMAGE OF HIGH S/N RATIO | DITTO | DITTO |
| MRI | DITTO | DITTO | | |
| SPECT | DITTO | DITTO | | |
| PET | DITTO | DITTO | | |
| GAMMA CAMERA RADIOGRAPHY | DITTO | DITTO | | |
| X-RAY CT | MULTICHANNEL RADIOGRAPHING | TO OBTAIN MANY SORTS OF IMAGES OF HIGH S/N RATIO | DITTO | PIXEL VALUES ARE CALCULATED FROM PLURALITY OF SORTS OF IMAGES. AS TO SORTS k (k = 1, ... K), $v(x) = (v_1(x), v_2(x), ... v_k(x))$ IS CALCULATED FROM SCALAR VALUES $V_k(x)$ AT SAME PARTS OF IMAGES k. |
| MRI | RADIOGRAPHING BASED ON MANY SORTS OF PULSE SEQUENCES | DITTO | | |
| SPECT | MULTIWINDOW RADIOGRAPHING | DITTO | | |
| PET | DITTO | DITTO | | |
| COLOR CAMERA | COLOR RADIOGRAPHING | TO OBTAIN COLOR IMAGE OF HIGH S/N RATIO | | |

| ALL RADIO-GRAPHING EQUIPMENT | ALL RADIOGRAPHING METHODS | TO OBTAIN IMAGE OF HIGH S/N RATIO | VECTOR VALUES v(x) OF PIXEL x IS CALCULATED AS v(x) = (v(y1), v(y2), ..., v(yk)·v(x)) BY USING SCALAR VALUES OF PIXEL Z(x) = {y1, y2, ..., yk·x} CONTAINED IN VICINITY Z(x) OF x |
|---|---|---|---|
| SPECT, PET, X-RAY CT, MRI | 3D VOLUME RADIOGRAPHING | TO OBTAIN IMAGE OF HIGH S/N RATIO | VECTOR VALUES v(x) OF PIXEL x IS CALCULATED AS v(x) = (v(y1), v(y2), ..., v(yk)·v(x)) BY USING SCALAR VALUES OF PIXEL Z(x) = {y1, y2, ..., yk·x} CONTAINED IN VICINITY Z(x) OF x. IN CASE OF 3D RADIOGRAPHING, z IS IN THREE-DIMENSIONAL VICINITY |
| | DITTO | DITTO | |

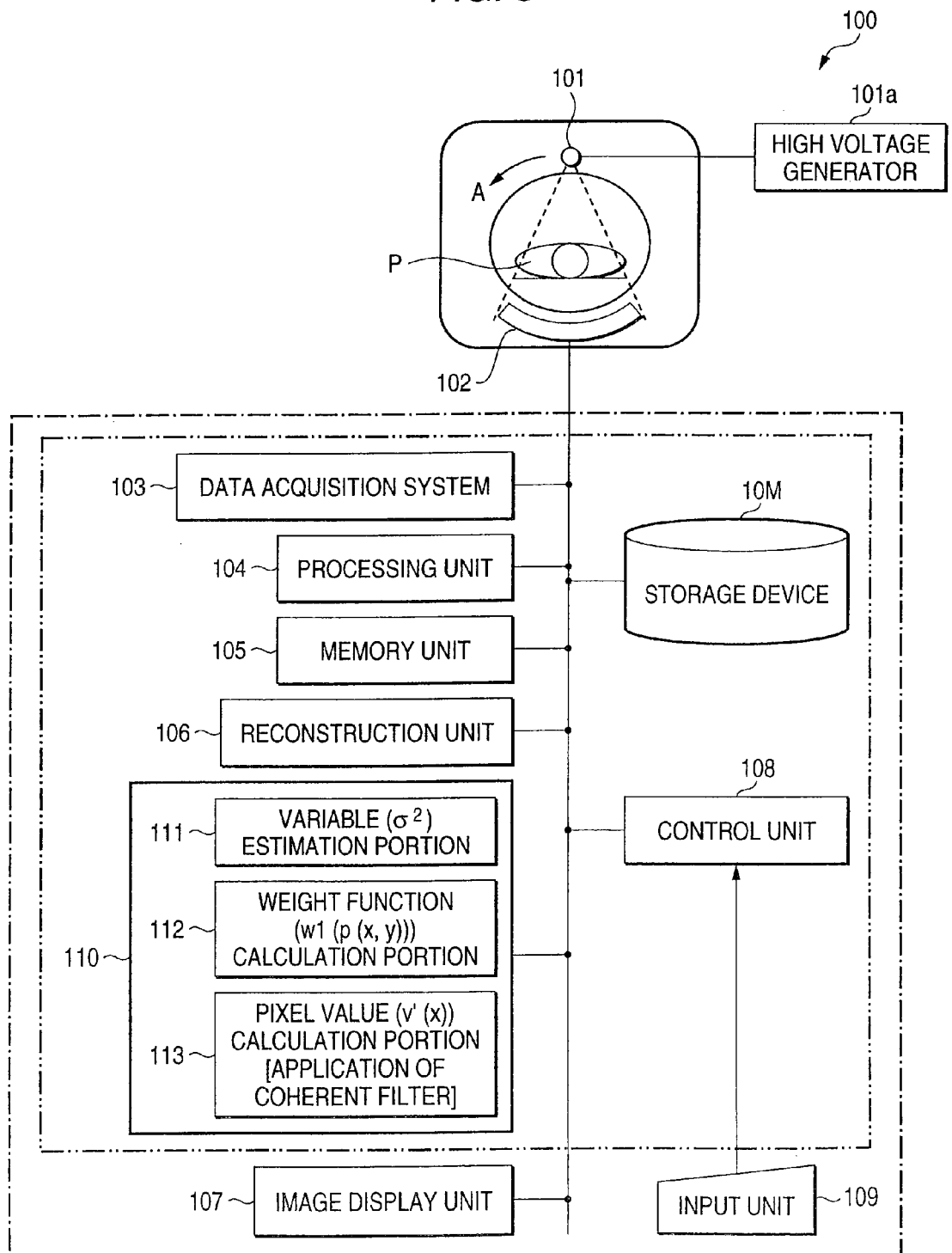

FIG. 4 (a)

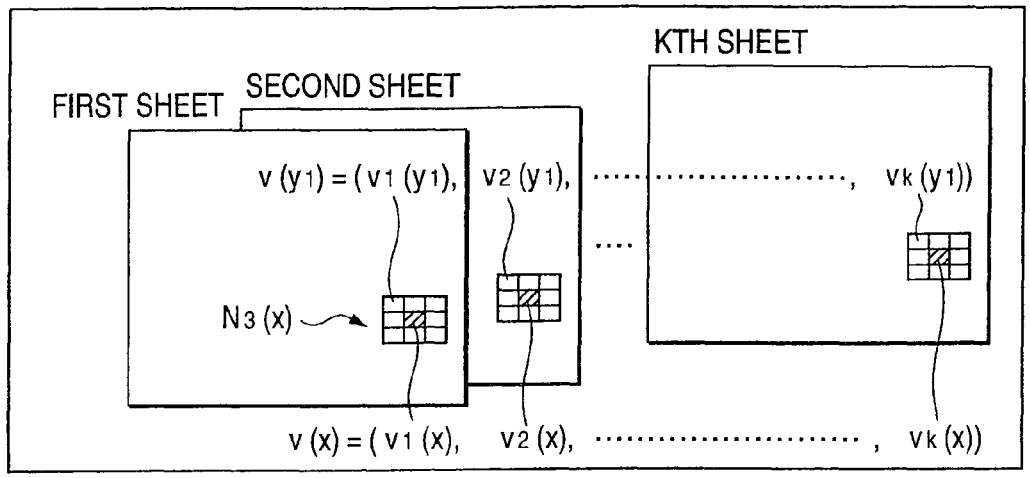

FIG. 4 (b)

WEIGHTS CONCERNING PIXELS $y_1$-$y_8$
AND x AS CALCULATED FOR SET $N^{3\times3}(x)$

| $w_1(p(x, y_1))$ | $w_1(p(x, y_2))$ | $w_1(p(x, y_3))$ |
|---|---|---|
| $w_1(p(x, y_4))$ | $w_1(p(x, y))$ | $w_1(p(x, y_5))$ |
| $w_1(p(x, y_6))$ | $w_1(p(x, y_7))$ | $w_1(p(x, y_8))$ |

FIG. 4 (c)

$v'_k(x)$ CALCULATED FROM
$v_k(y_1) - v_k(y_8)$ AND $v_k(x)$ IN kTH IMAGE

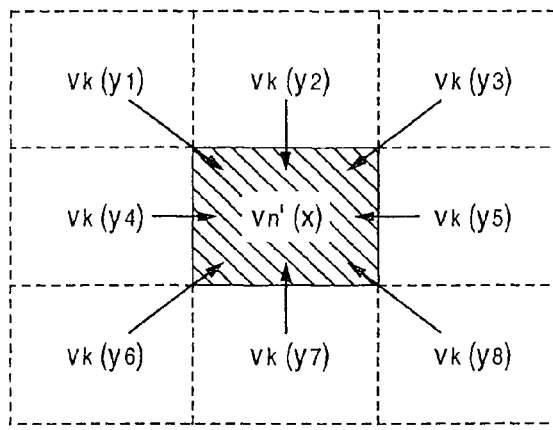

FOR K STATIC IMAGES IN FIGURE $$w_1(p(x,y)) = \exp\left[-\left\{\frac{\sqrt{\sum_{k=1}^{k}\frac{\{v_k(x) - v_k(y)\}^2}{K}}}{2\sigma}\right\}^c\right]$$

$$v'_k(x) = \frac{\sum_{y \in (y_1, \cdots, y_8, x)} v_k(y) \cdot w_1(p(x,y))}{\sum_{y \in (y_1, \cdots, y_8, x)} w_1(p(x,y))}$$

IMAGE PROCESSING METHOD AND IMAGE PROCESSING APPARATUS

CROSS-REFERENCE TO RELATED APPLICATIONS

This application is a continuation and claims the benefit of priority under 35 U.S.C. §120 from U.S. application Ser. No. 10/680,256, filed on Oct. 8, 2003, which is a Continuation Application of PCT Application No. PCT/JP01/03362, filed Apr. 19, 2001, which was not published under PCT Article 21(2) in English. The contents of U.S. application Ser. No. 10/680,256 and PCT/JP01/03362 are hereby incorporated by reference in their entirety.

BACKGROUND OF THE INVENTION

1. Field of the Invention

The present invention relates to an image processing method and an image processing apparatus, and more particularly to the method and the apparatus which can reduce noises existing on an image.

2. Description of the Related Art

At present, image processing technology has come to be utilized in various fields.

Image processing is executed in order to cope with, e.g., the degradation and amelioration of an image acquired by a video tape recorder, a digital camera or the like, or it is executed for the purpose of, e.g., clearly grasping the pattern or structure itself of a structural object in order to inspect if the structure is manufactured as designed.

Also in various medical image diagnostic equipment such as an X-ray CT equipment, SPECT equipment and MRI equipment, multifarious image processing aspects are executed. Regarding the execution of, e.g., the depiction of a blood stream or contrast medium stream, the sampling of a morbid part, or the contouring of internal organs, benefits are extensively accepted.

The image processing technology consists of various constituent techniques such as a noise suppression technique, feature extraction technique and pattern recognition technique, and the individual techniques are utilized alone or in an appropriate combination. Incidentally, among such constituent techniques, especially a technique which reduces random noises contained in an image is an indispensable one for more clearly reproducing an object subjected to imaging, reconstruction or the like.

Further improvements, however, are required of the prior-art image processing technology, especially the noise reduction technique. By way of example, so-called "smoothing" is widely known as the noise reduction technique. The smoothing is such that, when an input value $f(i, j)$ exists for a certain pixel$(i, j)$, an average density in the vicinity of the pixel$(i, j)$ is afforded as an output value $g(i, j)$ for the pixel$(i, j)$. Concretely, assuming that n×n pixels in the vicinity of the pixel$(i, j)$ are used, the output value $g(i, j)$ is found as:

$$g(i, j) = \sum_{k=a}^{b} \sum_{j=c}^{d} \frac{1}{(b-a+1)(d-c+1)} \cdot f(i+k, j+1) \quad (1)$$

Here, letters a, b, c and d in the above equation (1) denote integers. Besides, $1/(b-a+1)(d-c+1)$ in the equation (1) is a so-called "weight". Incidentally, FIG. 13 shows a case where a, b, c and d=−1, 1, −1 and 1.

Meanwhile, it is generally known that, when the average value of n samples independently taken from the distribution of a population whose variance is $\sigma^2$ is computed, the variance of the average value becomes $\sigma^2/n$. According to the equation (1), therefore, the "population" and "its variance $\sigma^2$" mentioned above correspond to a probability distribution whose random variable is a component ascribable to noises contained in the value of each pixel$(i, j)$, and the variance thereof, respectively, so that the component of the value $f(i, j)$ of each pixel attributed to the noises can be lowered.

Merely by simply applying the smoothing, however, so-called "edge obscurity" appears, the spatial resolution of an image is spoilt, and the impression is given that the whole image is unsharp. Regarding, for example, the medical image referred to above, even in a case where a minute blood vessel structure is to be depicted with the least possible noise, the noise suppression processing based on the equation (1) executes the averaging (smoothing) also in pixels which do not originally depict the blood vessel structure. Therefore, admitting that the noises are suppressed, a contrast expressive of the blood vessel structure is also lowered by the smoothing, so that the depiction of the minute blood vessel structure sometimes becomes difficult.

The present invention has been made in view of the above circumstances, and has for its object to provide an image processing method and an image processing apparatus which can satisfactorily suppress noises without giving rise to the unsharpness of an image, and which can effectively contribute to other image processing techniques, for example, a pattern recognition technique.

BRIEF SUMMARY OF THE INVENTION (Fundamental Construction of Present Invention)

The present invention first consists in an image processing method characterized in that, in a case where a pixel value which is a vector value or a scalar value is constructed for a pixel which constitutes a certain image, where the goodness of fit between the pixel value and another pixel value constructed separately from the former pixel value is quantified, and where a new pixel value for the pixel is constructed by utilizing the other pixel value, the new pixel value is constructed by making the contribution of the other pixel value large when the goodness of fit is high, and by making the contribution of the other pixel value small when the goodness of fit is low.

Besides, in the present invention, the "other pixel value constructed separately" may well be constructed on the basis of other pixels which constitute the image. That is, in this case, the pixel values are respectively constructed as "one pixel value" and the "other pixel values" each being a vector value or a scalar value, for one pixel and the other pixels.

Further, in the present invention, especially in case of constructing the new pixel value in such a way that a weight function which is a function of the goodness of fit is exerted on the goodness-of-fit values found for the respective other pixel values, so as to determine the weights of the respective other pixel values, and that the weighted average of the other pixel values is subsequently calculated using the weights, the new pixel value is constructed by making the weight large when the goodness of fit is high, so as to make the contribution of the corresponding other pixel value large in the weighted average of the other pixel values, and by making the weight small when the goodness of fit is low, so as to make the contribution of the corresponding other pixel value small in the weighted average of the other pixel values.

According to such processing, the new pixel value is constructed with importance attached to the other pixel which is decided "similar" to one pixel. Therefore, the spatial resolution is not spoilt as is in the prior art, or a temporal resolution is not spoilt in a case where the image is a dynamic one.
(Weight Function and Weight)

In the present invention, the weight function should preferably be a non-negative monotonously increasing function which concerns the goodness of fit.

Besides, one pixel and the other pixel as mentioned above are respectively denoted by x and y, and their pixel values by $v(x)=(v_1(x), v_2(x), \ldots, v_K(x))$ and $v(y)=(v_1(y), v_2(y), \ldots, v_K(y))$, while the new pixel value to be constructed is denoted by $v'(x)=(v'_1(x), v'_2(x), \ldots, v'_K(x))$. Further, the goodness of fit is denoted by $\rho(x, y)$, the weight function is denoted by w, and the weight obtained by exerting the weight function w on the goodness of fit is denoted by $w(\rho(x, y))$. Then, the processing for taking the weighted average should preferably in a form expressed as follows:

$$v'_k(x) = \frac{\sum_{y \in N(x)} v_k(y) \cdot w(\rho(x, y))}{\sum_{y \in N(x)} w(\rho(x, y))} \quad (2)$$

(where N(x) denotes a range in which the other pixel is included.) (Hereinbelow, the form like the right side of the above equation for finding the new pixel value v'(x) shall be termed "coherent filter according to the present invention".)
(Example of Image Processing Technology to which Present Invention is Applicable)

The present invention is capable of various applications such as the processing described above, in which the new pixel values are constructed over, for example, the whole area of the image, thereby to reduce the noises of the image or to perform pattern recognition in the image. As will be described later, the present invention exhibits excellent effects in such constituents of the image processing technology.
(Goodness of Fit)

In the present invention, the goodness of fit may well be quantifiable on the basis of a critical probability which results from the application of a statistical test method to the scalar values respectively constituting one pixel value and the other pixel value stated above. Incidentally, as the "statistical testing method" termed here, a "$\chi$-square test method", for example, can be considered as will be described later. Besides, in general, the relationship between the critical probability introduced here and the goodness of fit shall include especially a case where, when one of them increases, the other decreases. That is, when the critical probability heightens (the goodness of fit lowers) in constructing the new pixel value, the weight for the other pixel becomes small (the contribution of the other pixel to the new pixel value to be constructed becomes small), and when the critical probability lowers (the goodness of fit heightens), the weight for the other pixel becomes large (the contribution to the new pixel value to be constructed becomes large).
(Selection Range of "Other Pixel")

Besides, the present invention may well be such that the other pixel is selected from within a predetermined region around one pixel mentioned above, and especially that the predetermined region is the vicinity centering round one pixel mentioned above. With such a construction, the other pixel decided similar to one pixel is usually much likely to exist around one pixel mentioned above, so that, when the region as stated above is selected, wasteful calculations can be omitted in effectively finding the new pixel value.
(Method of Constructing Pixel Values)

In the present invention, various methods of constructing the pixel values (both one pixel value and the other pixel value) can be selected. More concretely, in the first place, in a case where the image consists of a plurality of images, the pixel values can be set as vector values in each of which the scalar values of pixels at the same points in all of the plurality of images are arrayed.

On this occasion, the plurality of images may well be a plurality of static images which constitute a dynamic image. In such a case, the present invention does not spoil the spatial resolution and does not spoil the temporal resolution, either, in finding the new pixel value. Incidentally, a favorable application in such a case is, for example, a case where the dynamic image is a dynamic CT image acquired by a medical image diagnostic equipment.

Besides, the second method of constructing the pixel values corresponds to a case where the image consists of a plurality of sorts of images which concern an identical subject. Herein, as in the foregoing, the pixel values can be set as vector values in each of which the scalar values of pixels at the same points in all the plurality of sorts of images are arrayed. Incidentally, a favorable application in such a case is, for example, a case where the image is an image acquired by multiwindow radiography in a SPECT equipment or PET equipment, and where the plurality of sorts of images are images different from one another, based on gamma rays emitted from different radioisotopes. Another favorite application is, for example, a case where the image is a color image, and where the plurality of sorts of images are images different from one another as acquired by decomposing light into three primary colors.

Further, as the third method of constructing the pixel values, the image is a single image, and the pixel values can be constructed on the basis of the single image. More concretely, the pixel values can be constructed as, for example, vector values in which the scalar values of a certain pixel on the single image and the scalar values of a pixel existing in the vicinity of the certain pixel are respectively arrayed. Incidentally, according to such a method of constructing the pixel values, the present invention is applicable to any digital image. (Preferred apparatus construction for Realizing Image processing of Present invention)

Lastly, an apparatus construction for realizing the image processing method described above should preferably comprise goodness of fit quantification means for deciding the goodness of fit between a pixel value constructed as a vector value or a scalar value and another pixel value separately constructed, as to a pixel which constitutes a certain image, and pixel value calculation means operating in constructing a new pixel value concerning the pixel by utilizing the other pixel value, for constructing the new pixel value by making the contribution of the other pixel value large when the goodness of fit is high and by making the contribution of the other pixel value small when the goodness of fit is low.

BRIEF DESCRIPTION OF THE SEVERAL VIEWS OF THE DRAWING

FIG. 1 is a table showing the consequent relationships of a critical probability $p(x, y)$, a weight $w(p(x, y))$ and a null hypothesis.

FIG. 2 is a table showing various examples of applications in embodiments of a coherent filter according to the present invention, by classifying them in accordance with differences in a method of constructing a pixel value v(x).

FIG. 3 is a diagram showing an example of the schematic arrangement of an X-ray CT equipment in which the coherent filter is incorporated.

FIG. 4 is an explanatory diagram for conceptually explaining image processing based on the coherent filter according to the present invention.

DETAILED DESCRIPTION OF THE INVENTION

Figure 5A:
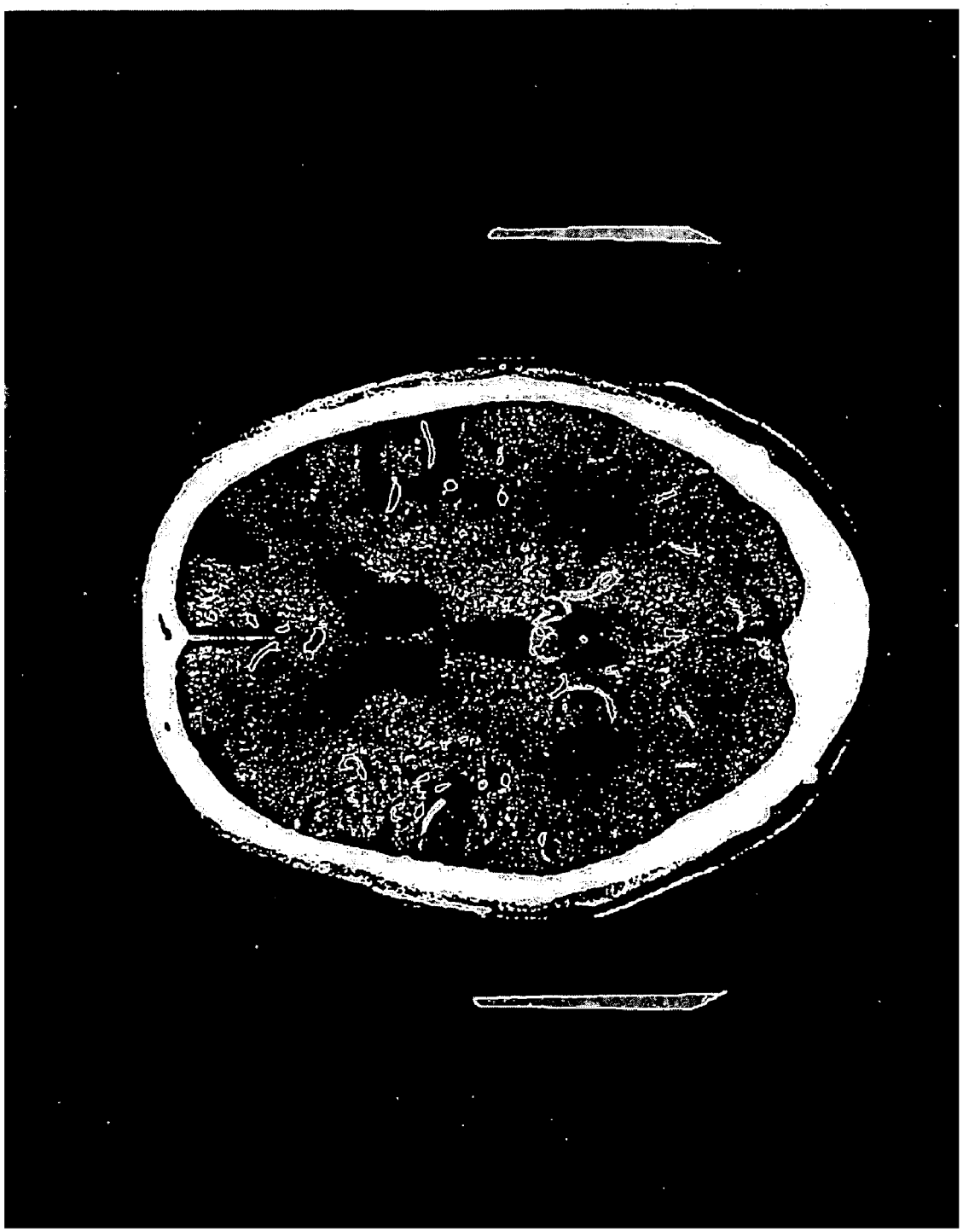
FIG. 5 shows an example in which a plurality of images constituting a dynamic CT image are subjected to noise suppression processing based on the coherent filter according to the present invention; wherein (a) shows an original image not processed yet, and (b) and (c) show processed images, respectively.

Now, embodiments of the present invention will be described with reference to the drawings. Incidentally, hereinafter, more general description (Item No. "I" below) on the outline of a "coherent filter" according to the present invention shall be first made, and examples (Item Nos. "II" and "III"-"VIII") in which the coherent filter is applied to various image processing aspects shall be thereafter described in succession.

The description of such various examples of applications shall be further followed by description on the most general form of the coherent filter in the embodiment and an example of application (Item No. "IX") thereof, and the supplementary items (Item No. "X") of the embodiments shall be lastly summed up.

(I General Description of Coherent Filter According to Present Invention)

First, there will be made preparatory description for describing the "coherent filter" according to the present invention.

(I-1 Pixel Value v(x))

In general, a digital image acquired through imaging means such as a camera is constituted by a plurality of pixels (or, the image can be considered a set of such pixels). In the ensuing description, the position of each of the pixels will be expressed as a vector x (that is, a vector of coordinate values), a value (for example, a numerical value expressive of a density) which the pixel x has will be expressed as a K-dimensional vector. In case of a two-dimensional image, the pixel x is a two-dimensional vector which indicates the coordinate values (x, y) expressive of the position on the image. A "pixel value v(x)" defined for a certain pixel x is denoted as:

$$v(x)=(v_1(x),v_2(x),\ldots,v_K(x)) \quad (3)$$

Incidentally, $v_1(x)$, $v_2(x)$, ... and $v_K(x)$ on the right side of this equation (3) shall be respectively called "scalar values" concerning the pixel x stated below.

By way of example, when the image is a "color image", each pixel has brightnesses (scalar values) in three primary colors (red, green and blue), so that the pixel value v(x) of each pixel can be considered as a vector whose number of dimensions is K=3 (suppose a case where, in the right-side terms of the above equation (3), suffixes are, for example, "red", "green" and "blue", and refer to Equation (3.1) to be mentioned later). Besides, in a case, for example, where the image is a dynamic image consisting of K static images, and where each pixel of the nth image has a scalar value $v_n(x)$, a K-dimensional vector value $v_n(x)=(v_1(x), v_2(x), \ldots, v_K(x))$ which is constructed by arraying the pixel values (scalar values) of pixels x at the same common points (same coordinates) on the K static images is the pixel value being the vector value to be described later.

(I-2 Goodness of Fit or Critical Probability p(x, y) and Weight w(p(x, y)))

For the pixel x, a suitable set N(x) of pixels is considered (the set N(x) may well include the pixel x). Subsequently, a weight w(p(x, y)) is considered between the pixel x and each pixel y which is the element of the set N(x). The weight w(p(x, y)) has properties as stated below.

(I-2-1 Goodness of Fit or Critical Probability p(x, y))

First, there will be explained the significance of the function p(x, y) which governs the value of the weight w(p(x, y)). This function p(x, y) is means for quantifying the "goodness of fit" as termed in the present invention. Generally speaking, it gives a concrete numerical value indicating the degree to which the pixel x and a pixel y∈N(x) are similar in any sense (for example, the degree of a statistical difference which is noticed between the pixel values v(x) and v(y) of both the pixels x and y).

More concretely, by way of example, when the function p(x, y) gives a small value, it is judged that a "statistically significant difference does not exist (=the goodness of fit is high)" between the pixel values v(x) and v(y), and that the pixels x and y are much likely to be similar, and when the function p(x, y) gives a large value, it is judged that a "statistically significant difference exists=the goodness of fit is low)".

Meanwhile, it must be considered that noises are inevitably contained in the pixel values v(x) and v(y) (or the scalar values $v_1(x)$, ..., $v_K(x)$ and $v_1(y)$, ..., $v_K(y)$). By way of example, when a case is considered where the image has been acquired by a CCD imaging device, noises which are ascribable to dark currents within the device and the irregular fluctuations of the quantity of light entering from the outside exist as to the individual pixels constituting the image.

In general, such noises take diverse values as to all the pixels. Therefore, even if the pixels x and y reflect an identical object (in the outside), they sometimes fail to have the same values on the image which is actually observed. Conversely speaking, supposing a situation where the noises have been removed from the pixels x and y both of which reflect the identical object, they are displayed (=recognized) on the image as representing the identical object, and both the pixels ought to have the same (or very close) pixel values.

Therefore, when the concept of a "null hypothesis" well known in a statistical testing method is employed as to the function p(x, y) in consideration of the properties of the noises stated above, this function p(x, y) can be concretely elucidated as below. In case of building up the null hypothesis H that "the pixels x and y have the same pixel values when their noises have been removed", in other words, that "v(x)=v(y) except differences ascribable to the noises of both the pixels" (that is, when such a proposition is concluded, it is considered that "both the pixels x and y are similar (=the goodness of fit is high)", the function p(x, y) can be said a critical probability (or a significant level) in the case where the hypothesis H is abandoned (in this case, p(x, y) is defined as the function whose range is [0, 1] (p(x, y)∈[0, 1])).

Accordingly, in a case where the critical probability p(x, y) is high, that is, where the abandonment is much likely to be erroneous, the possibility of fulfilling the hypothesis H can be said high, and conversely, in a case where the critical probability p(x, y) is low, that is, where the abandonment is little likely to be erroneous, the possibility of failing to fulfill the hypothesis H can be said high. (Incidentally, as is well known in the statistical testing, even when the hypothesis H is not "abandoned", it is not meant that this hypothesis is "true". In this case, it is merely meant that the proposition indicated by the hypothesis H cannot be negated.)

(I-2-2 Weight w(p(x, y)))

Meanwhile, as apparent from its expression, the weight w(p(x, y)) is the function of the critical probability p(x, y) as explained above (more generally, it can be constructed as w(ρ(x, y)) (where ρ(x, y) denotes the goodness of fit) as the function of the goodness of fit). Besides, the weight function w which is exerted on the critical probability p(x, y) obtained for each combination of the pixels x and y, in order to find the weight w(p(x, y)) has, in general, the action of incarnating the above "abandonment". Concretely, the weight function w is adjusted in such a manner that, in a case where the critical probability p(x, y) is high, the value of the weight function w, namely, the weight w(p(x, y)) takes a large positive value, and that, in the converse case, it takes a small positive value (or "0") (the concrete form of the weight function w will be explained later). That is, the weight w(p(x, y)) takes the large value in a case where the pixels x and y are likely to fulfill the proposition indicated in the hypothesis H, and it takes the small value in the converse case. By way of example, the function w may well be especially constructed so as to be capable of taking only the two values of "0" and a constant value which is not "0".

Incidentally, the relationships among the hypothesis H, critical probability p(x, y) and weight w(p(x, y)) thus far explained are summed up in FIG. 1.

Besides, the weight function w(t) can be more generally said a "non-negative monotonously increasing function defined for t∈[0, 1]", and a property which this function w(t) is to satisfy may be, at least, such.

(I-3 Coherent Filter)

Owing to the preparatory description thus far made, the "coherent filter" according to the present invention is derived as stated below. First, as to a certain pixel x constituting an image, the weights w(p(x, y)) stated above are computed for all the pixels y being the elements of a set N(x). Subsequently, using the plurality of weights w(p(x, y)), new scalar values $v'_k(x)$ to constitute the pixel x are computed by the following equation:

$$v'_k(x) = \frac{\sum_{y \in N(x)} v_k(y) w(p(x, y))}{\sum_{y \in N(x)} w(p(x, y))} \quad (4)$$

Here, k=1, 2, . . . , K. Besides, using $v'_k(x)$ obtained with this equation, a pixel value (new pixel value) v'(x) after the transformation of the pixel x is constructed as:

$$v'(x) = (v'_1(x), v'_2(x), \ldots, v'_K(x)) \quad (5)$$

Herein, a filter which transforms the pixel value $v(y)=(v_1(y), v_2(y), \ldots, v_K(y))$ (including a case where y=x holds) as expressed by the above equation (4), into $v'(x)=(v'_1(x), v'_2(x), \ldots, v'_K(x))$, is the form of the "coherent filter" according to the present invention, in this embodiment. As apparent from the expression, the new pixel value represents the weighted average values of the scalar values $v_k(y)$ constituting the pixel value.

Such processing brings forth results as stated below. The pixel value v'(x) comes to express a vector which is constituted by the weighted average values $v'_k(x)$ with importance attached to the pixel y that may probably take the same pixel value as that of the pixel x except noises (=that is much likely to fulfill the proposition of the hypothesis H). Besides, if such pixels y exist in a sufficient number, the pixel value v'(x) comes to have a value with only the noises suppressed by the above averaging action, without deviating from the true value of the pixel x as ought to be had.

By the way, even in a case where the critical probability p(x, y) is low, and the null hypothesis H is accordingly "abandoned", so that the weight w(p(x, y)) becomes small, the hypothesis is not always completely "abandoned" as understood from the above description or the expression of Equation (3). Even in a case where the critical probability p(x, y) is close to "0" (=0%), the weight w(p(x, y))≠0 may well be set (at a positive value which is smaller than in a case where the probability p(x, y) is close to "1"), though such depends upon the concrete form of the weight function w to be described later. (Incidentally, p(x, y)=1 corresponds to a case where v(x)=v(y) holds as will be stated later.) That is, unlike the complete abandonment, a small contribution may well be admitted. (By the way, if the weight w(p(x, y))=0 is set in such a case, this has the same meaning as the complete abandonment. Refer to Equation (14) later.)

Such processing can be generally elucidated as below. It can be said an image processing method in which, when (a plurality of) pixels x constituting a certain image exist, the goodness of fit between each pixel x and a certain desired pixel y (set as y∈N(x) in the foregoing) is quantified (on the basis of p(x, y) in the foregoing), and in which, when the goodness of fit is high, a large contribution is admitted for the pixel y in the weighted averaging process utilizing the pixel value v(y), and when the goodness of fit is low, only a small contribution is admitted, whereby the noises of the pixel x are effectively suppressed. In other words, when the pixels x and y are "similar to each other", the pixel y is caused to contribute to the averaging process more, and when they are "dissimilar to each other", the pixel y is almost or utterly ignored.

By executing such processing over the whole image, a very high effect of suppressing noises can be exhibited without almost no unsharpness of the image. Moreover, not only in the application to the noise suppression, but also in the field of, for example, pattern recognition, excellent effects can be exhibited by bringing the weight function or the coherent filter into a preferred concrete form. Incidentally, how these effects are in the concrete will be stated in the ensuing description on various image processing aspects.

(II Various Examples of Applications; Classification Based on Differences in Method of Constructing Pixel Value v(x))

Meanwhile, the present invention is applicable to multifarious fields on the basis of the general form of the coherent filter described above. The applications can be summed up as listed in FIG. 2 by way of example. By the way, in the list of FIG. 2, the various examples of applications in multifarious fields are classified in accordance with differences in the method of constructing the pixel value v(x). According to FIG. 2, it is understood that the pixel value v(x) being the vector value stated above can be constructed by individual schemes "from a plurality of images" (obtained by, for example, one time of radiographing), "from a plurality of sorts of images" or "from a single image", and that the various examples of applications concerning this embodiment are classified into the individual schemes.

Now, there will be successively described the various examples of applications in which the coherent filter having the general form as stated above is applied in more practicable scenes, along the classification table shown in FIG. 2, and how three sorts of methods of constructing the pixel value v(x) shown in FIG. 2 are realized in the concrete (in an different from that shown in FIG. 2).

(III Case 1 of Applying Present Invention to X-Ray CT Radiography; Dynamic CT Radiography (to Eliminate Noises from Plurality of Images))

First, there will be described a case where the coherent filter is applied to so-called "dynamic CT" radiography in an X-ray CT equipment. Here, as shown in FIG. 3, the X-ray CT equipment 100 includes an X-ray tube 101 as well as an X-ray detector 102, a data acquisition system 103 (DAS), a preprocessing unit 104, a memory unit 105, a reconstruction unit 106 and an image display unit 107. Also included are a control unit 108 which controls these constituents, and an input unit 109 which is capable of various settings and inputs of an X-irradiation condition, a radiographing mode, etc.

According to the X-ray CT equipment 100, a subject or patient P is exposed to X-rays while the X-ray tube 101 and the X-ray detector 102 are being rotated around the patient P, whereby the internal state of the patient P can be observed as a CT image, for example, tomogram.

On this occasion, the constituents mentioned above operate as outlined below. X-rays emitted from the X-ray tube 101 by the voltage application of a high voltage generator 101a and transmitted through the patient P, are converted into an analog electric signal by the X-ray detector 102. Thereafter, the analog electric signal is subjected to a digital conversion process by the data acquisition system 103, and various correction processes by the preprocessing unit 104, and the resulting digital signal is stored in the memory unit 105 as projection data. Besides, the tomogram or any other CT image is reconstructed by the reconstruction unit 106 on the basis of the projection data obtained in such a way that the X-ray tube 101 and the X-ray detector 102 has made, for example, one revolution (=360°) round the patient P, and the image display unit 107 displays the CT image. Incidentally, it is also possible to store the reconstructed CT image in a storage device 10M.

Here, the "dynamic CT" radiography mentioned above signifies a radiographing scheme wherein the X-ray tube 101 and the X-ray detector 102 iteratively radiograph the identical part of the patient P (by iterative scans, and iterative radiographing based on continuous rotation is often performed in a continuous rotating CT equipment) so as to successively acquire projection data, and reconstruction processes are successively performed on the basis of the projection data so as to obtain a series of images in time series. (In this case, an image display in the image display unit 107 is controlled by, for example, an unshown counter so as to be presented a predetermined time period after a scan start point or end point concerning the acquisition of the source projection data of the pertinent image.)

Accordingly, the image thus acquired and displayed becomes a so-called "dynamic image" which consists of a plurality of time-series static images as in a motion picture or the like. Incidentally, such a radiographing scheme is typically used in order to analyze the morbidity of a morbid part, for example, constriction or obstruction in a blood vessel by injecting a contrast medium into the patient P and observing and investigating the change of the image with the passage of time. Besides, a scheme wherein the CT radiographing of an identical part is performed only twice before and after the contrast medium is given can be considered as dynamic CT radiography in a broad sense.

Meanwhile, in the prior art, in a case where the patient P has undergone any change (for example, the density change of the contrast medium, or a respiratory motion is generally considered) in the "dynamic CT" radio graphing mode as stated above, for example, while K times of radio graphing are performed, smoothing in the direction of time has been inevitably executed in order to suppress image noises without spoiling a spatial resolution. Consequently, it has been impossible to avoid the drawback that a temporal resolution is spoilt.

In this regard, the image acquired by the dynamic CT radiography is the dynamic image and is intended to minutely observe temporal changes, as stated above, so that the spoilage of the temporal resolution cannot be originally said a favorable situation.

When the coherent filter according to the present invention is utilized, it is possible to execute processing to be stated below (hereinafter, called "dynamic coherent filtering") which can suppress noises for all of K static images (a plurality of images) without spoiling a temporal resolution.

First, regarding a pixel x which is defined as to the K static images constituting the dynamic image obtained in the above way, the following can be constructed as a pixel value v(x) as already stated:

$$v(x)=(v_1(x),v_2(x),\ldots,v_K(x)) \qquad \text{(3 mentioned before)}$$

Here, suffixes 1, 2, . . . , and K at the respective terms on the right side are Nos. allocated through the K static images (refer to the foregoing description on Equation (3)).

Subsequently, the concrete form of a weight function w1 in this case is given by, for example, the following equation:

$$w1(p(x,y)) = \exp\left[-\left\{\sqrt{\sum_{k=1}^{k} \frac{\{v_k(x)-v_k(y)\}^2}{K(2\sigma_k)^2}}\right\}^c\right] \qquad (6)$$

Here, y∈N(x) holds, and the set N(x) may be set at will as to the pixel x (=it may be set in accordance with any criterion). In actuality, however, it can be said that the pixel x and the pixel y lying at a position far distant from the pixel x fulfill the hypothesis "v(x)=v(y) except differences ascribable to the noises of both the pixels" generally at a low possibility, and hence, it has a practical significance, such as enhancement in a computing speed, that the set N(x) is limited by the criterion of being a set of pixels close to the pixel x.

Accordingly, as an example here, the set N(x) is assumed to be a set of pixels which are included in a rectangular area centering around the pixel x. More concretely, in a case, for example, where all pixels constituting one static image now noticed are 128×128 pixels, the set N(x) may be selected as the area of 3×3 pixels around the pixel x. Also, in a case where all pixels are 512×512 pixels, the set N(x) may be selected as the area of 13×13 pixels around the pixel x.

Besides, $\sigma_k$ in the above equation (6) denotes the standard deviation of noises estimated assuming that the individual pixels of the kth static image have the noises at a certain common degree, while C denotes a parameter for permitting to determine and adjust the degree of an action in the case where the weight $w1(p(x, y))$ is substituted into Equation (4) mentioned before.

Now, these quantities $\sigma_k$ and C will be explained in succession.

First, the quantity $\sigma_k$ in Equation (6) will be explained (it will be explained as a variance $\sigma_k^2$ below). As stated above, the variance $\sigma_k^2$ is that of the noise components which the scalar values of the individual pixels on the kth static image have. Besides, the variance $\sigma_k^2$ in the above equation (6) has been estimated assuming that the scalar values of the individual pixels of the kth image contain the noises of the variance $\sigma_k^2$ being a constant value. In general, such an assumption is satisfactorily reasonable with a background as stated below.

First, in a state where the size of the patient P, and the structures of the X-ray tube 101 as well as the X-ray detector 102, the reconstruction unit 106, etc. are constant, and where the energy of irradiating X-rays is held constant, the noises of a CT image are determined by the quantity of X-irradiation, that is, the product between a tube current in the X-ray tube 101 and an irradiating time period (what is called "current time product" (mA·s)) as is in a proportional relation with the quantity of X-irradiation. On the other hand, it is also known that the noises of the CT image are additive and substantially conform to a Gaussian distribution. More specifically, when $v_n^0(x)$ is let denote a true value (a value obtained by eliminating the contribution component of noises) as to any scalar value $v_n(x)$ (n=1, 2, . . . , K) which constitutes the pixel value $v(x)$ of a certain pixel x, the value of the difference between them; $v_n(x) - v_n^0(x)$ substantially conforms to a Gaussian distribution of average 0 and variance $\sigma_k^2$ (incidentally, the quantity of X-irradiation or the current time product mA·s and the variance $\sigma_k^2$ of the noises are substantially in an inversely proportional relation).

Besides, although the variance $\sigma_k^2$ depends also upon the position itself of the pixel x (for example, coordinate values x=(x, y) as stated above), it is negligible in the ordinary X-ray CT equipment 100 because a physical X-ray filter for adjusting the quantity of X-irradiation (what is called "wedge" or "X-ray filter" constructed of, for example, copper foil or metal lump) (not shown) is interposed between the X-ray tube 101 and the X-ray detector 102. The reason therefor is as stated below. The wedge has the function of adjusting (absorbing or shielding) part or all of the irradiating X-rays so that approximately the same quantity of X-irradiation may be detected in any X-ray detector 102, by utilizing the fact that the patient P is constructed of substances being substantially equal in density to water. Accordingly, such a wedge results in producing the effect of making the variance $\sigma_k^2$ of the noises a constant value which hardly depends upon the position of the pixel x. (Incidentally, the wedge is disposed usually with the original object of effectively utilizing the dynamic range of the X-ray detector 102.)

In the light of the above facts, it is reasonable that, in the K static images acquired by the dynamic CT radiography, the variance $\sigma_k^2$ being the constant value is estimated for all the pixels on the kth static image. Of course, the expansion of this embodiment will be easily suggestible as to a case where the variance differs every pixel (as will be described in detail in Section X-3 later).

Subsequently, it becomes a problem what numerical value is to be used as the variance $\sigma_k^2$ in concretely calculating the above equation (5). Such a problem is ascribable to the fact that, even if the shape of the distribution of noises (in the above, the Gaussian distribution) can be ordinarily supposed, the concrete value of the variance $\sigma_k^2$ is often unclear.

Further, in general, the radiography may well be performed by altering the quantity of irradiation (X-ray tube current× irradiating time period (mA·s)) every time of radiographing.

Now, letting $\sigma_k^2$ denote the variance of noises which the scalar values of individual pixels have in the kth image (k=1, 2, . . . , K), and $R_k$ denote the quantity of irradiation used in the radiographing of the kth image, $\sigma_k^2$ is proportional to $R_k$. Accordingly, when $\sigma k_0^2$ can be designated for at least one image k=$k_0$, the variance $\sigma_k^2$ can be precisely estimated concerning also the other images k's, in accordance with:

$$\sigma_k^2 = \sigma k_0^2 \frac{R_k}{R_{k0}}$$

In this embodiment (to which such circumstances apply), the concrete numerical value of the variance $\sigma_k^2$ can be estimated by a method stated below, as to at least one image k.

Effective is a method wherein, using N(1<N≦K) images as to which it can be assumed that the patient P hardly underwent changes in K times of radiographing, an expected value $E[\sigma_k^2]$ for the variance $\sigma_k^2$ is found by an actual measurement. For the brevity of the ensuing description, it is assumed that the N images are based on the same quantities of irradiation, so the variance $\sigma_k^2$ is constant (written as $\sigma^2$) for k=1, 2, . . . , N. It is conjectured that noises which are contained in individual scalar values $v_1(x_f), v_2(x_f), \ldots,$ and $v_K(x_f)$ constituting the pixel value $v(x_f)$ of a certain pixel $x_f$ in the N images conform to the Gaussian distribution of average 0 and variance $\sigma^2$ as stated before. Therefore, using the average value of the scalar values as follows:

$$v^*(x_f) = \frac{1}{N}\sum_{k=1}^{N} v_k(x_f) \quad (7)$$

the expected value $E[\sigma^2]$ for the true variance $\sigma^2$ can be calculated as:

$$E[\sigma^2] = \frac{1}{N-1}\sum_{k=1}^{N}\{v_k(x_f) - v^*(x_f)\}^2 \quad (8)$$

Herein, this expected value $E[\sigma^2]$ of the variance can be considered reasonable for all the pixels x on all the K static images as stated before, and it is a value as to which a certainty is guaranteed at or above a predetermined degree in the use thereof as a substitute for the true variance $\sigma^2$. In the actual calculation of the above equation (6), accordingly, the expected value $E[\sigma^2]$ may be substituted into the term $\sigma^2$ of Equation (6).

More concretely, such an expected value $E[\sigma^2]$ may well be calculated from actual measurement values based on, for example, the first and second static images among the K static images (in the above equations (7) and (8), this corresponds to setting N=2). Besides, regarding the pixel $x_f$ for use in the actual calculations of Equations (7) and (8), such a contrivance may well be made that only the suitable pixel $x_f$ except parts where the air or bones, for example, are imaged is selected (in a case where a plurality of pixels have been selected, all the expected values $E[\sigma^2]$ obtained are averaged). Further, in general, it is still better to make such a contrivance as suppressing influence ascribable to the movement of the patient P. (Incidentally, the evaluation of the variance $\sigma^2$ of noises in Equation (6) will be referred to again in "Supplementary items of Embodiments" to be stated last.

It will be easily suggestible that, even in a case where the quantities of irradiation are not constant in the radiographing steps of the N images, the variance $\theta_R^2$ is precisely estimated by utilizing the proportionality thereof to the quantity of irradiation $R_k$.

Next, the parameter C in the above equation (6) will be explained. First, in Equation (6), the idea of the critical probability p(x, y) stated concerning the general form is included as below. An expression within a root in the numerator of the right side of Equation (6) agrees with a $\chi^2$ value which conforms to a so-called "$\chi$-square distribution". A value which is obtained in such a way that the $\chi^2$ value is divided by $(2\sigma)^2$ and that the entirety in braces is put at the shoulder of e, is the critical probability p1(x, y) itself. That is:

$$p1(x, y) = A \exp\left\{-\sum_{k=1}^{k} \frac{\{v_k(x) - v_k(y)\}^2}{K(2\sigma_k)^2}\right\} \quad (9)$$

Besides, the above equation (6) is nothing but the following formed as to p1(x, y) expressed by this equation (9):

$$w1(p(x, y)) = \{p1(x, y)\}^{-\frac{C}{2}} \quad (10)$$

Incidentally, letter A denotes a constant which normalizes the critical probability p1 so as to become a value of (0 through 1).

After all, the critical probability p(x, y) stated above as to the general form is not positively indicated in Equation (6), but the actual state of the weight w1(p(x, y)) can be deemed the very function (Equation (10)) of the critical probability (=p1(x, y)) as described above, that is, it is the "function of the goodness of fit". (As stated before, the critical probability and the goodness of fit are in the relationship that, when one increases, the other increases, too.)

Besides, as seen from the above equation (10), the parameter C has the effect of determining how sensitively the weight w1(p(x, y)) reacts with the critical probability p1(x, y). That is, when the parameter C is enlarged, the weight w1(p(x, y)) approaches zero merely by the slight decrease of the critical probability p1(x, y). In contrast, when the parameter C is made small, such an oversensitive reaction can be suppressed. Incidentally, the parameter C may be concretely set at about 1 through 10, and it should preferably be set at C=3.

In this embodiment, the similarity decision concerning both the pixels x and y, in other words, the decision of the abandonment of the foregoing null hypothesis H concerning both the pixels x and y, is made by a so-called "%-square test method" (statistical testing method) on the basis of the critical probability p1(x, y) as understood from the above description.

Besides, as seen from the expression of the above equation (6), in the present invention, the steps of computing the critical probabilities p(x, y) for the respective combinations of the pixels x, y and thereafter finding the weights w(p(x, y)) need not always be traced, but a composite function (wOp) may well be directly computed without concretely calculating the critical probabilities p(x, y).

As thus far described, the variance $\sigma^2$ is estimated (for example, $E[\sigma^2]$ in Equation (8)), and the parameter C is appropriately determined (for example, C=3), whereby the concrete weights w1(p(x, y)) can be found for all the pixels y which are included in the set N(x) defined as to the certain pixel x (for example, the area corresponding to 3×3 pixels around the pixel x as stated above), by using Equation (6). Thereafter, the weights w1(p(x, y)) are used instead of w(p(x, y)) in the above equation (4), whereby the concrete numerical calculations of the coherent filter can be executed. As a result, the pixel value $v'(x) = (v'_1(x), v'_2(x), \ldots, v'_K(x))$ (=Equation (5)) with the noises intensely suppressed, in other words, such K static images or such a dynamic image can be obtained without spoiling, not only the temporal resolution, but also the spatial resolution.

It is FIG. 4 that shows such image processing so as to be easy of being conceptually grasped. First, referring to FIG. 4(a), in first, second, . . . and Kth static images, a rectangular area $N^{3\times3}(x)$ centering around a certain pixel x and corresponding to 3×3 pixels is supposed for the pixel x. Letting $y_1$ denote the pixel at the left upper corner of the rectangular area $N^{3\times3}(x)$, this pixel $y_1$ has a pixel value $v(y_1)$ as also indicated in FIG. 4.

Herein, a weight $w1(p(x, y_1))$ is computed by the above equation (6) on the basis of scalar values $v_1(y_1), v_2(y_1), \ldots,$ and $v_K(y_1)$ constituting the pixel value $v(y_1)$, and scalar values $v_1(x), v_2(x), \ldots,$ and $v_K(x)$ in a pixel value $v(x)$ (FIG. 4(b)). Besides, the remaining pixels $y_2, \ldots,$ and $y_8$ of the rectangular area $N^{3\times3}(x)$ are similarly processed, so that weights $w1(p(x, y_1)), \ldots, w1(p(x, y_8))$ and $w1(p(x, x))$ are finally obtained as shown in FIG. 4(b). (In this case, a critical probability p(x, x) is "1" in accordance with Equation (9), so that the weight $w1(p(x, x))$ is also "1" in accordance with Equation (10) (=the maximum weighting is done).)

Subsequently, the weights $w1(p(x, y_1)), \ldots, w1(p(x, y_8))$ and $w1(p(x, x))$ thus obtained are respectively multiplied by the scalar values $v_k(y_1), v_k(y_2), \ldots, v_k(y_8)$, and $v_k(x)$ of the corresponding pixels in the kth image, the resulting products have their summation taken (corresponding to a numerator in the above equation (4)), and the resulting summation is divided by the summation of the weights w1 concerning the rectangular area $N^{3\times3}(x)$ (corresponding to a denominator in the same equation (4)). Then, a scalar value $v'_k(x)$ with noises suppressed, concerning the pixel x in the kth image can be calculated (FIG. 4(c)). Besides, scalar values $v'_k(x)$ with noises suppressed are calculated for all the images of k=1, 2, . . . , K by using the same weights $w1(p(x, y_1)), \ldots, w1(p(x, y_8))$ and $w1(p(x, x))$, whereby pixel values $v'_k(x) = (v'_1(x), v'_2(x), \ldots, v'_K(x))$ with noises in the pixel x suppressed are obtained. When the above calculations are iterated for all the pixels x, K images with noises suppressed are obtained.

Figure 5B:
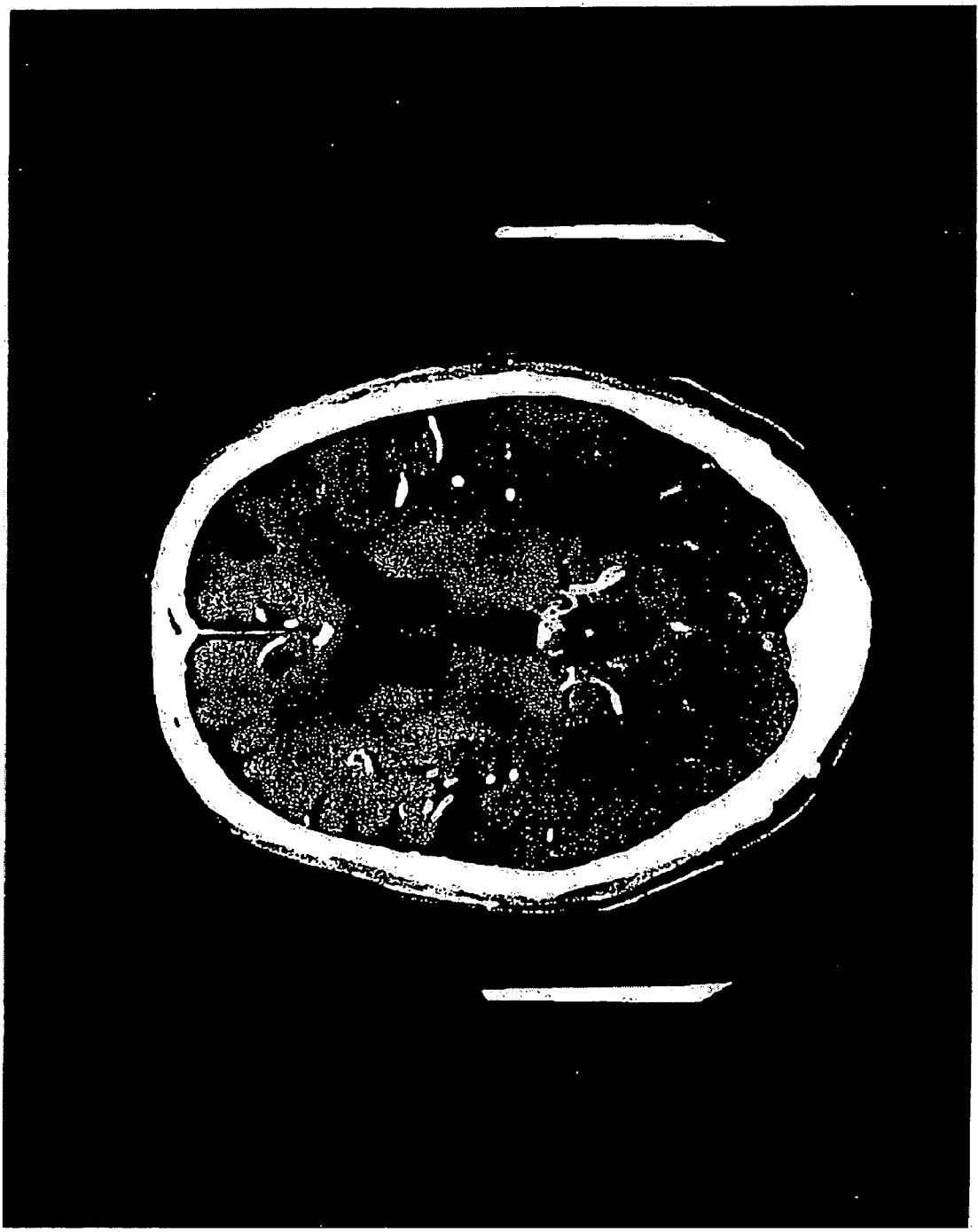
Figure 5C:

Images which are constituted by the pixel values v'(x) thus calculated become, for example, as shown in FIG. 5. FIG. 5(a) shows an original image (k 11) before the application of the coherent filter, among K=23 static images in all, and (b) and (c) show images after the application of the coherent filter, for k=11 and 23, respectively. Random noises seen in the original image of FIG. 5(a) are sufficiently suppressed in the images of FIGS. 5(b) and (c).

Figure 6:
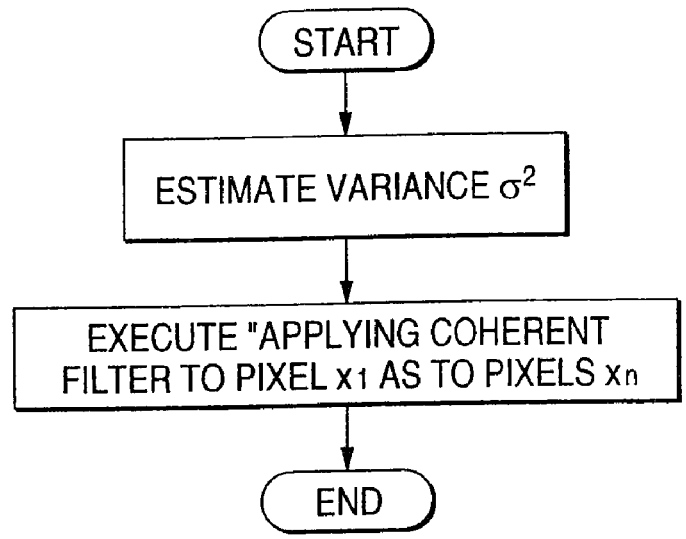
FIG. 6 is a flow chart showing the flow of the noise suppression processing based on the coherent filter in an embodiment.
Figure 6:
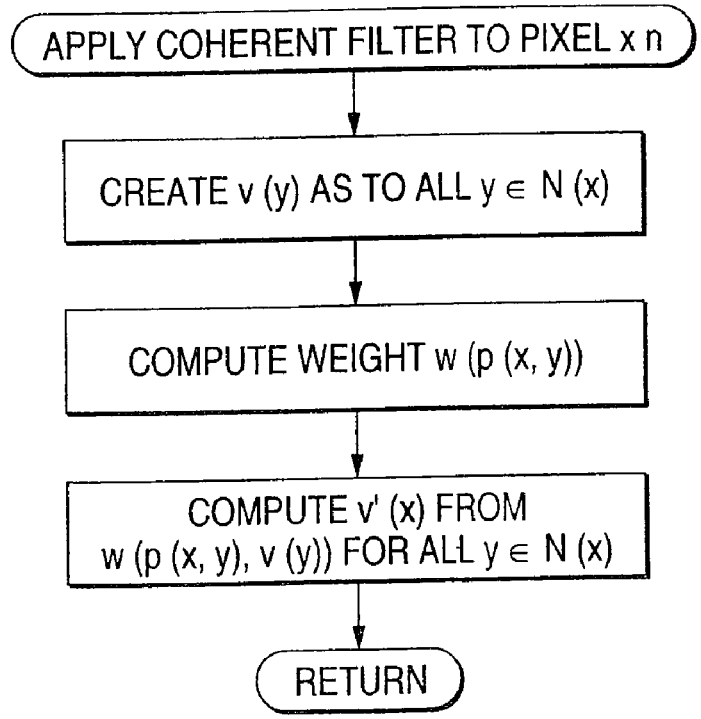

Incidentally, the processing steps thus far explained may be executed in accordance with, for example, flow charts as shown in FIG. 6. Besides, in order to realize the calculations, image display, etc. according to the processing steps, on the actual X-ray CT equipment 100, they may be executed by disposing, for example, an image processing unit 110 which is configured of a variance estimation portion 111, a weight calculation portion 112 and a pixel value calculation portion 113 as shown in FIG. 3.

Among them, the weight calculation portion 112 is so constructed that the weight $w1(p(x, y))$ is directly calculated from the pixel values $v(x)$ and $v(y)$ as in the foregoing procedure. Accordingly, the calculation portion 112 is a device which calculates the weight directly without concretely calculating the value of the critical probability $p1(x, y)$ (that is, by including a critical probability calculation portion (a "goodness of fit quantification portion" termed in the present invention)). Incidentally, unlike the construction as described above, a construction may well be adopted which traces the two stages of a "critical probability calculation portion (goodness of fit quantification portion) that concretely calculates the value of the critical probability $p1(x, y)$, and a "weight calculation portion" that calculates the weight $w1(p(x, y))$ on the basis of the output of the former portion. Anyway, the weight calculation portion 112 calculates the weight $w1(p(x, y))$ by using the variance $\sigma^2$ estimated by the variance estimation portion 111, and the pixel values $v(x)$ and $v(y)$.

Besides, the pixel value calculation portion 113 calculates the pixel value $v'(x)$ by using the pixel values $v(x)$ and $v(y)$, and the weight $w1(p(x, y))$ numerically calculated by the weight calculation portion 112. In other words, this calculation portion 113 actually performs the processing of suppressing the noises of the original image, that is, the application of the coherent filter (hereinbelow, such an operation shall be expressed as "to apply the coherent filter").

In a case where, in the dynamic coherent filtering as stated above, the coherent filter is applied to a dynamic image constituted by K static images, the processing in the image processing unit 110 may well be such that all the static images are once reconstructed and are thereafter stored in the storage device 10M, and that the coherent filter is applied to the stored images as postprocessing later. However, the present invention is not restricted to such an aspect, but the processing of applying the coherent filter may well be executed in real time in the foregoing flow of the continuous scan, continuous projection data acquisition, continuous reconstruction and continuous display (hereinbelow, such processing shall be called "real-time coherent filtering").

In a preferred embodiment of the real-time coherent filtering, processing to be described below is executed each time a new image is obtained and reconstructed. On K static images having image Nos. M, M−1, . . . , and M−K+1, among a firstly obtained image (image No. 1) through the newest image (image No. M), pixel values (scalar values) which pixels x of the same common points (same coordinates) have are arrayed to construct a K-dimensional vector value $v(x)=(v_M(x), v_{M-1}(x), \ldots, v_{M-K+1}(x))$. In this way, the coherent filter can be applied quite similarly to the "dynamic coherent filter processing" described before. Herein, the pixel value calculation portion 113 does not actually compute all the elements of the pixel value $v'(x)$, but it computes only the scalar value $v_M'(x)$ corresponding to the newest image (image No. M). As a result, a computing speed is enhanced, so that the newest image with noises suppressed can be displayed in real time.

Another preferred embodiment of the "real-time coherent filtering" may well be so constructed that, when first K images have been obtained, the coherent filter is applied quite similarly to the above, so as to find $v_1'(x), \ldots,$ and $v_K'(x)$, that a K-dimensional vector value is constructed of $v(x)=(v_M(x), v_{M-1}'(x), \ldots, v_{M-K+1}'(x))$ by thereafter using K static images which have image Nos. M, M−1, . . . , and M−K+1, and that the real-time coherent filtering is applied to the K-dimensional vector value. Incidentally, convenient is a construction in which, in the real-time coherent filtering, the dimensions K of the pixel value vector $v(x)$ are adapted to be occasionally altered by manual setting or automatic setting.

(IV Case 2 of Applying Present Invention to X-Ray CT Radiography; (to Obtain Single Image with Noises Reduced))

Next, there will be described a practicable example in which a single image with noises reduced is obtained unlike in the dynamic CT. Heretofore, generally in a case where a single CT image of little noises is to be obtained, there have been considered for the accomplishment the two ways of a scheme wherein K CT images obtained by K times of iterative radiographing in which an ordinary X-ray tube current is used have their simple average taken in the direction of time (by way of example, the simple average is $\{v_1(x)+ \ldots +v_K(x)\}/K$ when the concept of the pixel value $v(x)$ in this embodiment is utilized), with the result that the single image is obtained, and a scheme wherein the single image is obtained by one time of radiographing in which an X-ray tube current being K times as large as the ordinary one is used. In either of the schemes, the variance of noises becomes 1/K times as large as in the single image which is obtained by one time of radiographing by the use of the ordinary X-ray tube current (for the reason that, in the former scheme, the noises are averaged, while in the latter scheme, the quantity of X-irradiation and the variance of noises are in the inversely proportional relationship as stated before). Heretofore, accordingly, the single CT image has been generally obtained by the latter scheme of one time of radiographing as long as the performance of an X-ray tube allows, in view of the efficiency of operations, or by the former scheme of K times of iterative radiographing in a case where the performance of an X-ray tube cannot withstand the large-quantity of X-ray tube current.

With these schemes, however, the quantity of X-irradiation increases more as the noises are to be suppressed more. That is, the quantity of exposure of a patient P increases more.

Here, when the coherent filter according to the present invention is utilized, the noises contained in such a single CT image can be suppressed without increasing the quantity of exposure of the patient P.

First, in this embodiment, CT images numbering K are obtained by X-irradiation in a quantity smaller than an ordinary one, within a time period within which quite no change can be assumed as to a patient P. In this case, accordingly, as to a pixel x defined for the K CT images, a pixel value $v(x)$ can be constructed as:

$$v(x)=(v_1(x), v_2(x), \ldots, v_K(x)) \qquad \text{(3 mentioned before)}$$

as in the dynamic coherent filtering described before. By the way, in this case, the quantity of X-irradiation is small, and hence, the variance $\sigma^2$ of noises contained in each individual CT image is comparatively large.

Subsequently, a concrete form similar to the above equation (6) is given as a weight function in this case.

Since, however, an image to be finally obtained is a single CT image in this case, it is considered to employ a scheme as stated below.

Employable is, for example, a scheme wherein, as in the dynamic CT radiography, the coherent filter is applied to all of the K images, and the resulting K images have their weighted average or simple average taken, so as to construct the desired single CT image, or a scheme wherein the coherent filter is applied to only a single image selected at will from among the K images (=the calculations in FIG. 4(c) are executed only for the single image selected).

Incidentally, according to the former scheme, a computation for obtaining the single averaged image from the K images which result from applying the coherent filter to all the K images is concretely given, for example, as follows:

$$v^{*\prime}(x) = \frac{1}{K} \sum_{k=1}^{K} v'_k(x) \qquad (11)$$

Here, $v^{*\prime}(x)$ on the left side of Equation (11) denotes the pixel value (scalar) at the pixel x on the single image resulting from simple-averaging. On this occasion, the variance $(\sigma^2)^*$ of noises contained in $v^{*\prime}(x)$, substantially becomes:

$$(\sigma^2)^* = \frac{\sigma^2}{K} \cdot \sum_{y \in N(x)} \left[ \frac{w(p(x,y))}{\sum_{y \in N(x)} w(p(x,y))} \right]^2 \qquad (12)$$

Besides, since $w(p(x, y)) \geq 0$ holds here, a term summated on the right side of Equation (12) is always smaller than 1 (one). Accordingly, a noise suppression effect based on this embodiment is superior to the noise suppression effect $(\sigma^2/K)$ achieved by the prior-art scheme. Conversely speaking, if a noise suppression effect equivalent to that of the prior art is to be attained by employing this embodiment, the necessary quantity of X-irradiation may be smaller than in the prior-art scheme, and hence, the quantity of exposure of the patient P can be decreased.

Figure 7A:
FIG. 7 shows an example in which a single CT image is subjected to noise suppression processing based on the coherent filter according to the present invention; wherein (a) shows an original image not processed yet, (b) shows a processed image, and (c) shows an image obtained by averaging the image shown in (a) and the image shown in (b).
Figure 7B:

The effect attained by employing this embodiment is, for example, as shown in FIG. 7. FIG. 7(a) shows an image obtained by the prior-art scheme in which images based on K times of iterative radiographing are simply averaged in the direction of time, while FIG. 7(b) shows an image which is constructed by applying the coherent filter to all of K images and taking the simple average of the resulting K images, in accordance with this embodiment. It is understood that random noises seen in FIG. 7(a) are sufficiently suppressed in FIG. 7(b). (Incidentally, FIG. 7 shows the images obtained under the conditions that radiographing of 0.5-second scan was carried out three times (k=3), that a rectangular area corresponding to 13×13 pixels was used as the set N(x), and that the parameter C=3 was set.

Figure 7C:
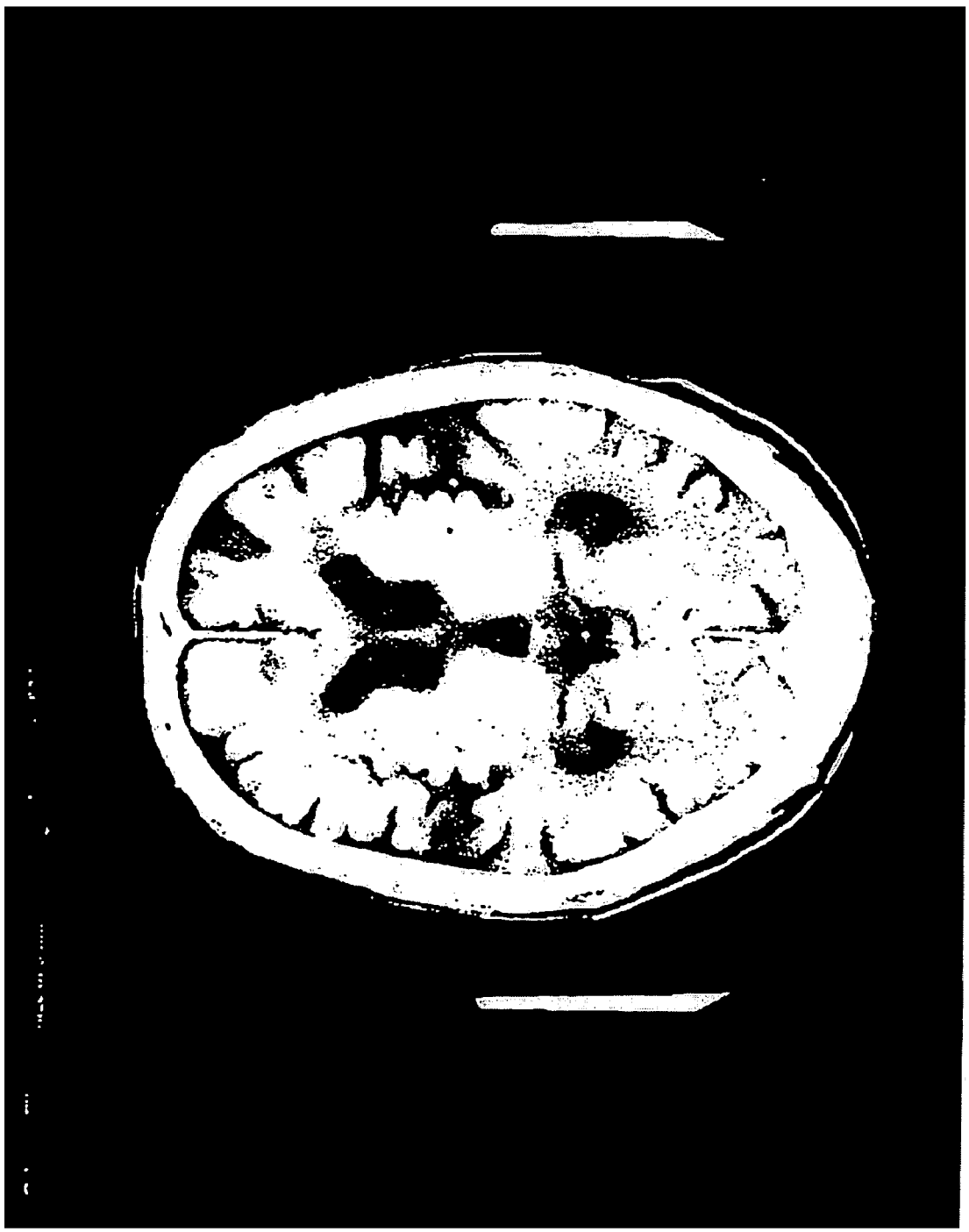

Besides, FIG. 7(c) shows an image which is constructed considering the point that, since the noise suppression effect in FIG. 7(b) is remarkably excellent, the image becomes unfamiliar as compared with the image in the prior art, and which is concretely obtained by averaging FIGS. 7(a) and 7(b). More specifically, letting the pixel value of the image in FIG. 7(c) be $v^{**\prime}(x)$, and a pixel value in FIG. 7(a) be:

$$v(x)(=\{v_1(x)+ \ldots +v_K(x)\}/K),$$

the image in FIG. 7(c) is obtained by setting u=½ in:

$$v^{**\prime}(x)=u \cdot v(x)+(1-u) \cdot v^{*\prime}(x) \qquad (13)$$

By the way, in the present invention, this embodiment itself (which can obtained the image in FIG. 7(b)) is not restrictive, but a construction is also preferable in which the value of u in the above equation (13) (subject to $0 \leq u \leq 1$), for example, is made adjustable according to the taste of a diagnostician.

(V Case 3 of Applying Present Invention to X-Ray CT Radiography; Multi-Energy Radiography (to Reduce Noises of Plurality of Sorts of Images))

Now, there will be described a case where the present invention is applied to so-called "multi-energy radiography". Here, the multi-energy radiography signifies a scheme wherein the energy distribution of irradiating X-rays is variously changed in such a way that a voltage which is applied to an X-ray tube 101 is altered, or that an X-ray filter which is constructed of a thin metal plate or the like is inserted between the X-ray tube 101 and a patient P, and wherein the identical patient P is radiographed under the plurality of energy distributions thus obtained. In this case, notwithstanding that the patient P does not change, images change depending upon the energy distributions of the X-rays, with the result that the plurality of sorts of images are obtained.

Assuming here that the patient P has been radiographed K times while the energy distribution is being altered, a pixel value $v(x)=(v_1(x), v_2(x), \ldots, v_K(x))$ can be constructed by arraying scalar values in the pixel x of the K sorts of images obtained by the K times of radiographing. Accordingly, the coherent filter can be applied to the pixel value v(x) by utilizing the same means as in the dynamic coherent filtering in the section (III Case 1 of Applying Present invention to X-ray CT radiography; Dynamic CT radiography (To eliminate Noises from Plurality of images)), with the result that the K sorts of images with random noises suppressed can be obtained.

(VI Cases of Applying Present Invention to Medical Image Diagnostic Equipment Other than X-Ray CT Equipment)

Now, there will be described embodiments in which the coherent filter according to the present invention is applied to medical image diagnostic equipment other than X-ray CT equipment, for example, nuclear magnetic resonance imaging equipment (so-called "MRI equipment"), nuclear medical diagnostic equipment ("scintillation camera, SPECT equipment, or PET equipment"), and fluoroscopic equipment.

(VI-1 Case of Applying Present Invention to MRI Equipment)

In the first place, there will be described examples of applications of the present invention concerning MRI equipment. Regarding the MRI equipment, the present invention is applicable to radiographic schemes hitherto called "averaging", "fast radiographing" and "three-dimensional radiographing" and also to a "radiographic scheme employing a plurality of pulse sequences", etc.

First, the averaging is a radiographic scheme wherein, with the object of suppressing image noises by averaging as indicated by its name, radiographing is iteratively performed while no change appears in a patient P, and a plurality of (K) images obtained have their simple average taken, thereby to obtain a single image. When scalar values in the pixel x of the K images are arrayed, a pixel value $v(x)=(v_1(x), v_2(x), \ldots, v_K(x))$ can be constructed. Besides, regarding a weight function w, the above equation (5) may well be employed by way of example. Accordingly, the coherent filter can be applied to the pixel value v(x) by utilizing quite the same means as in the dynamic coherent filtering in the section (III Case 1 of Applying Present invention to X-ray CT radiography; Dynamic CT radiography (To eliminate Noises from Plurality of images)), with the result that a plurality of images with noises suppressed as are superior to the images based on the averaging can be obtained. Alternatively, a single image with noises suppressed can be obtained by utilizing quite the same processing as in the section (IV Case 2 of Applying Present invention to X-ray CT radiography; (To obtain Single image with Noises reduced)).

Besides, the fast radiographing is a scheme wherein, when a change is appearing in a patient P, the patient P is iteratively radiographed, thereby to obtain a dynamic image which represents the change with the passage of time, and it is also called "dynamic MRI". Also in this case, a plurality of (K) static images are similarly obtained, and hence, noises can be suppressed by applying the coherent filter in quite the same way as in the dynamic coherent filtering in the section (III Case 1 of Applying Present invention to X-ray CT radiography; Dynamic CT radiography (To eliminate Noises from Plurality of images)), as in the case of the averaging. Further, in the fast radiographing, it is also allowed to apply quite the same processing as the real-time coherent filtering in the section (III Case 1 of Applying Present invention to X-ray CT radiography; Dynamic CT radiography (To eliminate Noises from Plurality of images)).

The three-dimensional radiographing is a radiographic method which obtains a three-dimensional image at one time. Also in this radiographic method, the averaging (namely, the processing in which, with the object of suppressing noises, radiographing is iteratively performed so as to take the simple average of the resulting images) or the fast radiographing (in which, when a change is appearing in a patient P, the patient P is iteratively radiographed) is sometimes carried out. In such a case, processing is quite the same as in the above method of applying the coherent filter to the averaging or the fast radiographing, except the point that a pixel x is expressed as a three-dimensional vector x=(x, y, z). Further, in order to apply the coherent filter when the three-dimensional radiographing is performed only once, a scheme which will be described in a section (VIII To Construct Pixel value v(x) from Single image) later is applicable.

Meanwhile, in the MRI equipment, different physical parameters can be brought into images by altering a pulse sequence. The "pulse sequence" signifies the combination of the sequence of applying RF pulses and a gradient magnetic field, intensities and time periods for applications, and a quiescent time period, and multifarious images can be obtained by changing the pulse sequence. As a very small number of examples of the pulse sequence which is typically used, there have been known ones which are called "T2*-weighted image", "T1-weighted image" and "proton-density image" prefixed by the physical parameters that contribute most to the contrasts of the images. Anyway, notwithstanding that a patient undergoes no change, the different images are obtained depending upon the pulse sequences, with the result that a plurality of sorts of images are, in effect, obtained. Accordingly, the coherent filter can be applied in quite the same way as in the section (V Case 3 of Applying Present invention to X-ray CT radiography; To reduce Noises of Plurality of sorts of images).

More concretely, assuming that the patient has been radiographed K times while the pulse sequence is being changed, a vector $v(x)=(v_1(x), v_2(x), \ldots, v_K(x))$ can be constructed by arraying scalar values in the pixel x of the images obtained by the K times of radiographing. Also in this case, accordingly, noises can be suppressed in such a way that the coherent filter is applied by utilizing quite the same means as in the dynamic coherent filtering, as in the case of the averaging.

(VI-2 Case of Applying Present Invention to Scintillation Camera, SPECT Equipment or PET Equipment)

Secondly, there will be described an example of application of the present invention concerning a scintillation camera, SPECT equipment or PET equipment. Such an equipment turns the distribution of a pharmaceutic drug (radiopharmaceutic drug) in a subject into an image by giving the pharmaceutic drug, which contains a radioisotope (hereinbelow, termed "RI"), into the subject and then detecting gamma rays emitted by the natural decay of the RI. Especially in a case where the subject is a living body, the equipment is employed with the object of obtaining a so-called "functional map" which represents the degrees of the biochemical metabolism and blood circulation of the living body. The scintillation camera obtains the distribution the radiopharmaceutic drug as a two-dimensional image as if the subject were examined by fluoroscopy. Besides, each of the SPECT equipment and the PET equipment obtains a three-dimensional image representative of the three-dimensional distribution of the radiopharmaceutic drug by utilizing computed tomography.

In the scintillation camera, SPECT equipment or PET equipment, the quantity of gamma rays to be detected is usually very small, and hence, so-called "photon noise" ascribable to dispersion in the number of photons as is caused by the quantum-mechanical property of the RI appears on an image.

Heretofore, in order to suppress the photon noise without degrading the resolution of the image, there has been no other method than increasing the quantity of gamma rays to-be-detected. Concretely, there have been a method of increasing the quantity of the RI which is given, and a method of lengthening a radiographing time period.

In a case where the quantity of the RI to be given can be increased (the increase of a dose is allowed for, for example, an experimental animal for a medical research), the photon noise can be reduced by the increase, but such a method is attended with increase in the quantity of exposure of an operator. Besides, in a case where a human body is diagnosed (=the human body is the subject), the increase in the quantity of the RI as stated above is not freely allowed originally (it is legally regulated). Further, in case of radiographing with radiation which is emitted from the RI contained in an natural object, the quantity of the radiation cannot be increased.

On the other hand, in a case where the method of lengthening the radiographing time period is to be employed, it is required for attaining a sufficient noise reduction effect that the subject is immobile for a very long time (for example, for several hours). This requirement is difficult of realization in a case where the living body (especially, the human body) is subject. Another problem has been that the processability (or cost performance) of the radiographing equipment lowers due to the long radiographing time period. In actuality, accordingly, it is only possible to set a suitable radiographing time period limited by an allowable time period (for example, within one hour), and intense noise inevitably appears in the image. Therefore, the noise is suppressed only by the smoothing of the image. It has accordingly been considered unavoidable that the resolution of the image is spoilt as a drawback attendant upon the smoothing.

In such a case, according to the present invention, processing as stated below can be executed. Within a time period equivalent to the suitable radiographing time period mentioned above, a plurality of times of radiographing in shorter time periods are performed, thereby to obtain a plurality of images containing comparatively much noises. Subsequently, quite the same processing as in the section (IV Case 2 of Applying Present invention to X-ray CT radiography; (To obtain Single image with Noises reduced)) is applied, whereby an image with the noises suppressed more can be obtained without spoiling a spatial resolution. Moreover, the processing can be realized without increasing the quantity of the RI.

Further, also in the scintillation camera, SPECT equipment or PET equipment, there is a radiographic scheme in which, as in the X-ray CT or the like, an identical subject or patient is iteratively radiographed, and a change with the passage of time in the distribution of a radiopharmaceutic drug within the patient is traced, that is, a radiographic scheme which is called "dynamic scintigram", "dynamic SPECT" or "dynamic PET". Also in this case, quite the same processing as the dynamic coherent filtering or real-time coherent filtering in the section (III Case 1 of Applying Present invention to X-ray CT radiography; Dynamic CT radiography (To eliminate Noises from Plurality of images)) is applicable, and the noises of images can be effectively suppressed.

Further, in the PET equipment or SPECT equipment, there is sometimes used so-called "multiwindow radiography" wherein, by utilizing the fact that an RI emits gamma rays of energy peculiar to its sort, a plurality of sorts of RIs are simultaneously given to a subject or patient so as to obtain respective distribution images as to the plurality of sorts of RIs at one time. The multiwindow radiography is based on a technique wherein the energy of detected gamma rays is measured, and which of the plurality of sorts of RIs emitted the gamma rays is discriminated depending upon if the levels of the energy fall within a numerical range (energy window) set artificially.

More concretely, a suitable number of energy windows (for example, windows W1 and W2) are set, and images, such as an image based on gamma rays corresponding to one of the windows (for example, the window W1) and an image based on gamma rays corresponding to the other window (for example, the window W2), are separately formed, whereby the plurality of RI distribution images stated above are obtained by one time of radiographing.

That is, an identical subject is radiographed using an imaging equipment, and the plurality of sorts of images are obtained under different treatment conditions. More generally speaking, the multiwindow radiography is a "radiographic scheme wherein, using K sorts of RIs, K sorts of images different from one another are obtained by one time of radiographing". Accordingly, the coherent filter can be applied in quite the same way as in the section (V Case 3 of Applying Present invention to X-ray CT radiography; To reduce Noises of Plurality of sorts of images).

Thus, also in this case, as to a pixel x on such K sorts of images, its pixel value $v(x)=(v_1(x), v_2(x), \ldots, v_K(x))$ can be constructed. Besides, although the variance of noises contained in the pixel value $v(x)$ differs depending upon the position of the pixel x and the sort of the image, it may be considered substantially proportional to the total amount of gamma rays detected every sort of the image, and it can be estimated from this property. As thus far described, the coherent filter can be applied also to the "multiwindow radiography" by applying the present invention, with the result that K sorts of images with random noises suppressed can be obtained.

By the way, in a nuclear medical diagnostic equipment, there are reconstruction methods effective for enhancing a resolution (an MU-EN reconstruction method for a fan beam, a superresolution reconstruction method for a fan-beam or parallel-hole collimator, etc.). It is not restricted in principle at all to combine these methods and the coherent filter according to the present invention. It is consequently possible to create images which have high resolutions, and in which random noises are sufficiently suppressed.

(VI-3 Case of Applying Present Invention to Fluoroscopic Equipment)

Thirdly, there will be described an example of application of the present invention concerning a fluoroscopic equipment. Supposed as the "fluoroscopic equipment" termed here is an equipment wherein, while a patient is being continuously exposed to X-rays of low dose, it is radiographed iteratively every predetermined time period (for example, 1/24 second), and wherein X-ray images obtained for individual "frames" each of which indicates one time of radiographing are successively displayed, whereby a so-called "fluoroscopic image (dynamic image)" can be observed. In general, accordingly, an equipment which includes a construction called "C arm" or "Ω arm" corresponds to the fluoroscopic equipment. Besides, an aspect to be stated below is naturally applicable to the foregoing X-ray CT equipment 100 as long as the functions stated above are installed.

In such a fluoroscopic equipment, the fluoroscopic image contains much random noises ascribable to photon nose because of the low dose mentioned above. When the quantity of X-irradiation is sufficiently increased in order to solve such a problem, the quantity of exposure increases drastically, not only in the patient, but also in an inspector, for the reason that the continuous X-irradiation is performed.

When the coherent filter according to the present invention is applied, it is permitted to solve these problems and to offer a fluoroscopic image with the noises suppressed satisfactorily.

Concretely, image Nos. 1, 2, . . . , and M shall be successively assigned to the images obtained for the respective frames, for the sake of the ensuing description. The newest K images, namely, the images of image Nos. M, M−1, . . . , and M−K+1 are stored in a memory, and these K images are subjected to quite the same processing as the dynamic coherent filtering or real-time coherent filtering in the section (III Case 1 of Applying Present invention to X-ray CT radiography; Dynamic CT radiography (To eliminate Noises from Plurality of images)).

Incidentally, apart from the medical image diagnostic equipment, the above method is applicable also to "fluoroscopic equipment" used for so-called "nondestructive testing".

Besides, the present invention is similarly applicable to a tomogram which is obtained by an ultrasonic diagnostic equipment. Also in this case, it holds true that images are successively generated while a subject is being continuously radiographed. It is accordingly possible to apply the coherent filter by the same construction as in the fluoroscopic equipment and to suppress noises.

(VII Case of Applying Present Invention More Generally; Color Image, Etc.)

The present invention is also applicable to "general equipment" handling images, other than the medical image diagnostic equipment stated above, or "general images". There will now be explained examples of applications of the present invention to such general equipment or images. Incidentally, a case of handling general "color images" as is an especially important field shall be chiefly described here.

In a color image, a three-dimensional vector whose elements are the brightnesses of the three primary colors of light can be constructed as to each pixel x constituting the image, as already stated. That is:

$$v(x)=(v_R(x),v_G(x),v_B(x)) \tag{3.1}$$

(where $v_R$, $v_G$ and $v_B$ signify the lights of R (red), G (green) and B (blue) being the three primary colors of light). As seen from FIG. 2, this corresponds to the case of "constructing pixel values v(x) from a plurality of sorts of images".

Besides, in a case where the color image is taken by, for example, a digital camera which is constructed of a CCD imaging device, a CMOS imaging device or the like, the variance of noises contained in the pixel values of each pixel is determined by the quantity of light having entered the pixel x. Concretely, the scalar values $v_R(x)$, $v_G(x)$ and $v_B(x)$ and the variances $\sigma_R^2(x)$, $\sigma_G^2(x)$ and $\sigma_B^2(x)$ of noises contained in the scalar values are in substantially proportional relationships, respectively. The estimative values of the variances of the noises can be found by utilizing this property. Accordingly, the concrete form of the weight function was in the above equation (6) is given and is used for constructing the coherent filter of the above equation (4), whereby pixel values v'(x)= ($v'_R(x)$, v'G(x), v'B(x)) with the noises suppressed can be obtained.

When the word "color" is grasped in the broadest sense so as to comprehend, for example, infrared rays and ultraviolet rays in addition to the red, green and blue lights mentioned above, the equation (3.1) can also be constructed as a vector of higher order or as a vector independent of the colors R, G and B. By way of example, it is known that the method of representing a color image by using the pixel values of vector values is not always limited to the three primary colors only, and the present invention may well be applied to a case of employing such a vector representation not using the three primary colors. Besides, cases of four primary colors including ultraviolet light $V_U$, five primary colors with violet $V_P$ separated (incidentally, this corresponds to the vision of butterflies), etc. are considered. In the case of, for example, the five primary colors, the pixel x is handled as having the five-dimensional vector values of $V(x)=(V_R(x), V_G(x), V_B(x), V_U(x), V_P(x))$, whereby the coherent filter can be applied as in the foregoing construction.

Further, in a photographing equipment wherein, in order to measure, for example, the light reflection spectrum of a subject, the subject is photographed by a monochromatic camera iteratively at individual illumination wavelengths while the wavelength of illumination light for illuminating the subject is being changed-over stepwise or continuously, or the subject is photographed iteratively by changing-over color filters stepwise, thereby to perform the photographing at a multiplicity of wavelengths, the pixel values v(x) can be constructed on the basis of a large number of images (each being of single wavelength or single color).

That is, the coherent filter can be applied by utilizing quite the same method as in the section (V Case 3 of Applying Present invention to X-ray CT radiography; To reduce Noises of Plurality of sorts of images), with the result that a plurality of sorts of images with random noises reduced are obtained.

Still further, many of such imaging equipment usually carry out one time of photographing in order to obtain a single image. However, when the present invention is applied, a plurality of (K) images should better be obtained by iterating photographing of short time period within the same photographing time period, as stated in the section (IV Case 2 of Applying Present invention to X-ray CT radiography; (To obtain Single image with Noises reduced)) concerning the "X-ray CT radiography". The reason therefor is that (although the K images contain much random noises because the quantity of light becomes small due to the short-time photographing) a single image with the random noises suppressed more intensely can be constructed by applying the coherent filter to the K images. Moreover, in a case where the K images are, for example, color images, they may well be handled as images "in a plurality of combinations (K combinations) each of which consists of a plurality of sorts (three sorts) of images obtained in correspondence with the three primary colors of light". More specifically, a three-dimensional vector whose elements are the brightnesses of the three primary colors of light can be constructed every pixel x constituting each image, so that the pixel values v(x) of a 3K-dimensional vector can be constructed for all of the K images. The coherent filter may well be applied to the pixel values of the 3K-dimensional vector.

Besides, in an imaging equipment, such as video camera, which takes a dynamic image, it is possible to apply the dynamic coherent filtering or real-time coherent filtering stated in the section (III Case 1 of Applying Present invention to X-ray CT radiography; Dynamic CT radiography (To eliminate Noises from Plurality of images)). Further, the coherent filter can be applied by handling the dynamic image as images "in a plurality of combinations (K combinations) each of which consists of a plurality of sorts (three sorts) of images obtained in correspondence with the three primary colors of light" as in the foregoing.

Incidentally, regarding images taken by a video camera, a noctovision camera, a fast photographing camera, etc. (generally, termed "imaging equipment" below) other than the digital camera stated above, the present invention is applicable in the same manner as described above. Especially, the noctovision camera or the fast photographing camera is a camera which is originally used in a situation where the quantity of light per frame is small, and images contain much random noises. It is unfavorable, however, to spoil a spatial resolution, and to spoil a temporal resolution particularly in the fast photographing camera. Therefore, the noctovision camera or the fast photographing camera is one of equipment most suited to apply the present invention.

Also in the imaging equipment, accordingly, images with noises suppressed more can be obtained by such photographing method.

Meanwhile, in an equipment, for example, video tape recorder or DVD player, which does not execute "imaging", but which is capable of reproducing an image that is based on a signal recorded on any recording medium or transmitted, when the coherent filter according to the present invention is applied to the image to-be-reproduced, a reproduced image with random noises suppressed can be obtained.

Further, in a case where a static image (so-called "pause image" or image for printing) is generated and displayed in such an equipment, a static image with random noises suppressed is obtained by applying the coherent filter, and it is also suitable for the printing, etc. For this purpose, it is possible to employ the method stated in the section (III Case 1 of Applying Present invention to X-ray CT radiography; Dynamic CT radiography (To eliminate Noises from Plurality of images)), the method stated in the section (V Case 3 of Applying Present invention to X-ray CT radiography; To reduce Noises of Plurality of sorts of images), a method to be stated below in a section (VIII To Construct Pixel value v(x) from Single image), or the combination of these methods.

(VIII to Construct Pixel Value v(x) from Single Image)

The examples of applications thus far described correspond to those examples in the classification shown in FIG. 2 in which the pixel values v(x) are respectively constructed "from a plurality of images" and "from a plurality of sorts of images". In the present invention, in addition to the two methods of constructing the pixel values v(x), to "construct a pixel value v(x) from a single image" is considered as also shown in FIG. 2, and this method of construction can be performed as stated below.

In a single two-dimensional image, for example, a single CT image acquired by the X-ray CT equipment 100, the MRI equipment or the like, or a single image based on the monochromatic photographing by the imaging equipment or the like, the value of a pixel x is constructed of only one scalar value. In other words, a pixel value v(x) being a vector value becomes a unidimensional vector.

One method for applying the coherent filter according to the present invention, in such a case, is to consider the pixel value v(x) as the "unidimensional vector" itself. That is, in the above equation (3), K=1 is put to obtain:

$$v(x)=v(x) \quad (3.2)$$

Thenceforth, the construction of the coherent filter or the suppression of image noises can be executed in the same way as in the foregoing procedure. The present invention covers also such a case where the "pixel value" v(x) being a "vector value" is the unidimensional vector, namely, the scalar value.

Besides, a weight w3 in this case can be calculated using, for example, the following equation:

$$w3(p(x,y))=\begin{cases} \left\{1-\left(\frac{v(x)-v(y)}{D\sigma}\right)^2\right\}^2 & : \text{for } |v(x)-v(y)| \leq D\sigma \\ 0 & : \text{for } |v(x)-v(y)| > D\sigma \end{cases} \quad (14)$$

Here, D has a property similar to that of the parameter C in Equation (6). That is, when D is small, the weight w3(p(x, y)) becomes smaller, and when D is large, the weight becomes larger.

Images which are based on pixel values v'(x) which are calculated from such a weight w3(p(x, y)) and the above equation (4), become as shown in FIG. 8 by way of example. FIGS. 8(a), (b), (c) and (d) are enhanced images each showing an example of 3D sampling of blood vessels, and FIG. 8(e) is an image obtained by sampling the gray matter of a brain as another sampling example. FIG. 8(a) shows a CT image (original image) which is to be processed by the coherent filter. FIGS. 8(b) and (d) show results obtained in such a way that the coherent filter is applied using a rectangular area of 3×3 pixels as the set N(x) in Equation (6). The result in FIG. 8(b) corresponds to a case where D=9 is set in the above equation (14), while the result in FIG. 8(d) is such that the image in (c) obtained by applying the coherent filter has been further subjected to threshold processing. Besides, shown in FIG. 8(c) is the image which is such that the original image in (a) has been subjected to threshold processing.

Figure 8A:
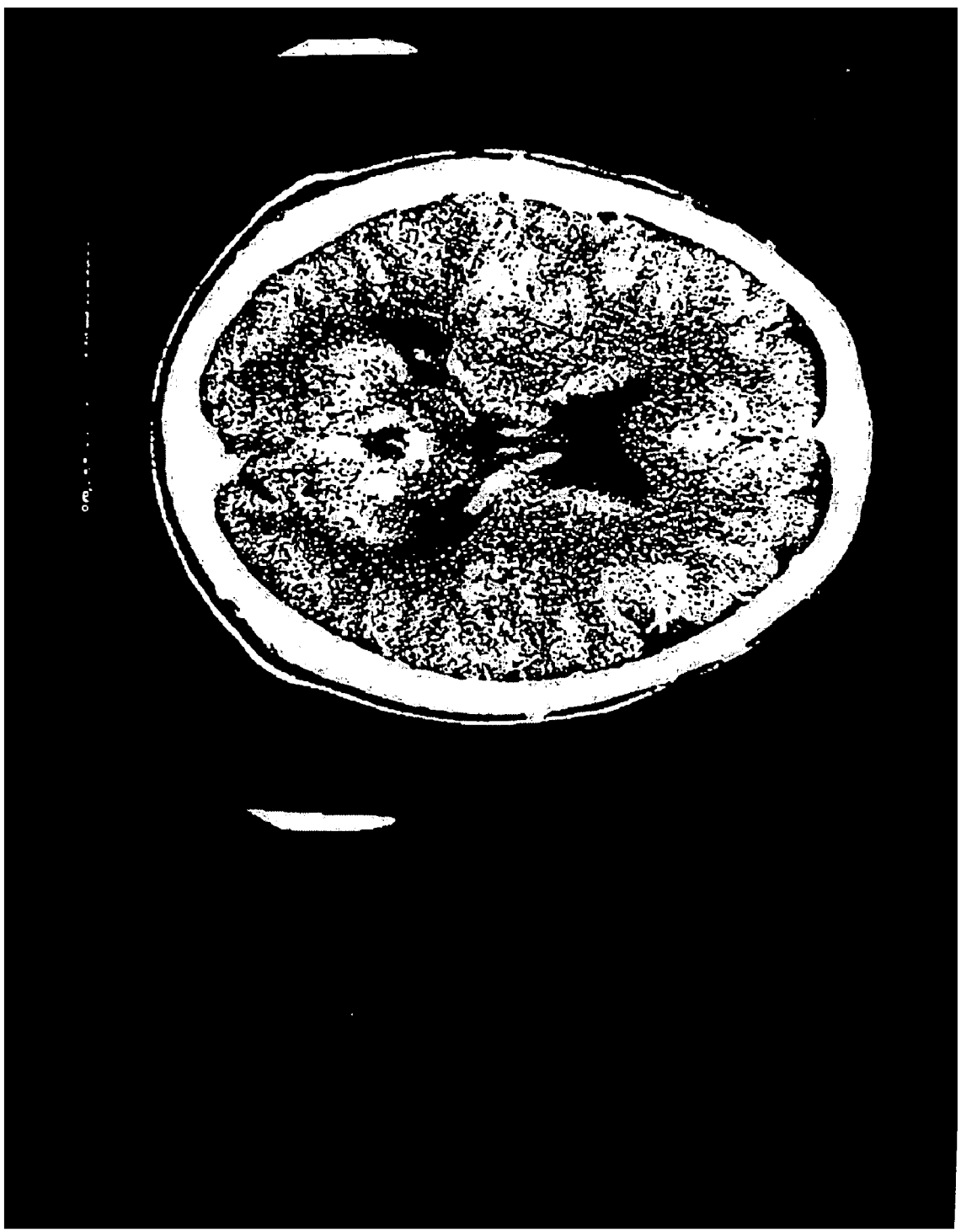
FIGS. 8(a), (b), (c) and (d) are enhanced images each showing an example of 3D sampling of blood vessels.
Figure 8B:
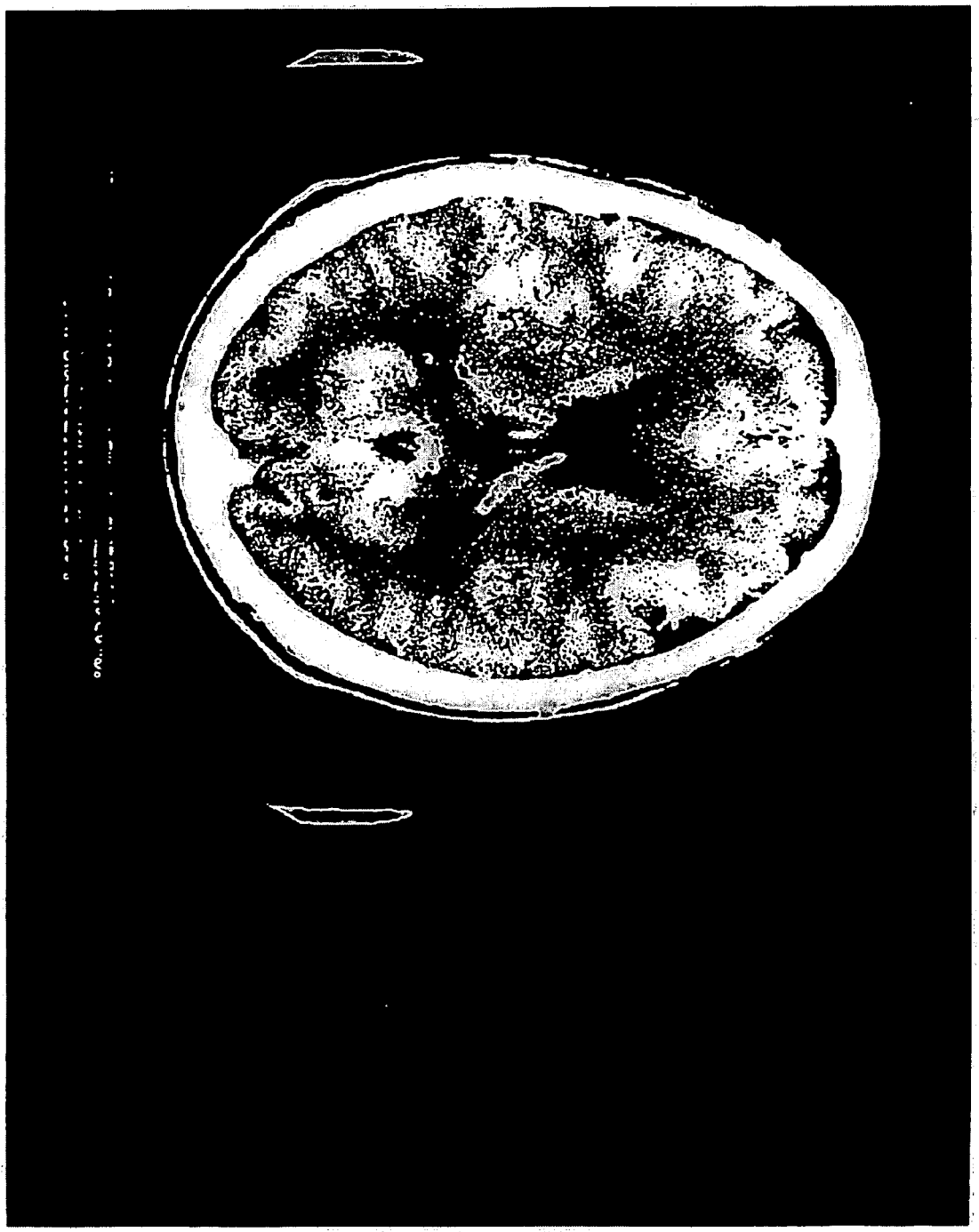
FIG. 8(e) is an image obtained by sampling the gray matter of a brain as another sampling example.

When the images of FIGS. 8(a) and 8(b) are compared, it is understood that, owing to the application of the coherent filter, the image of FIG. 8(b) has its noises properly suppressed in comparison with that of FIG. 8(a), so a quality satisfactory for a diagnosis is guaranteed.

Figure 8C:
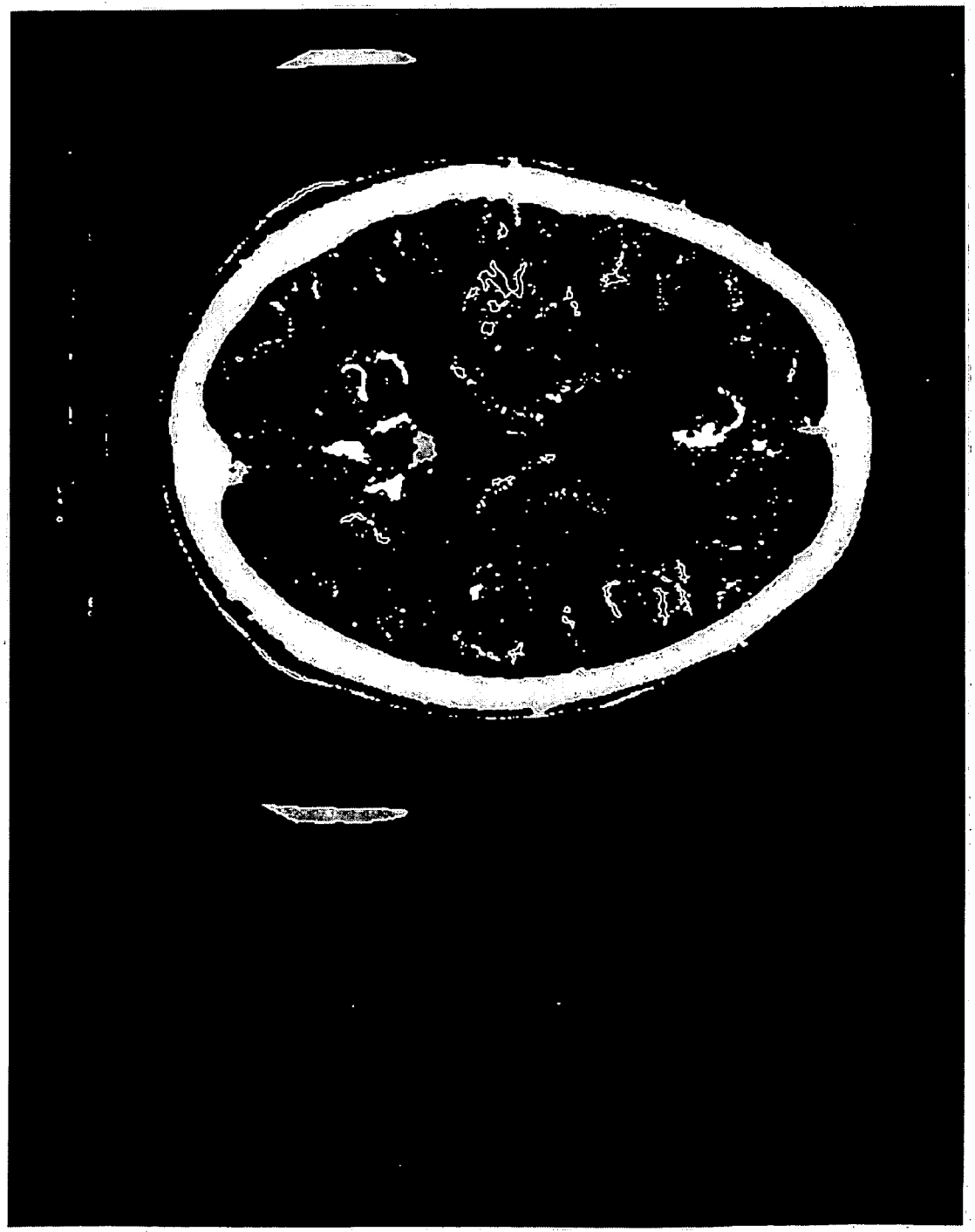
Figure 8D:
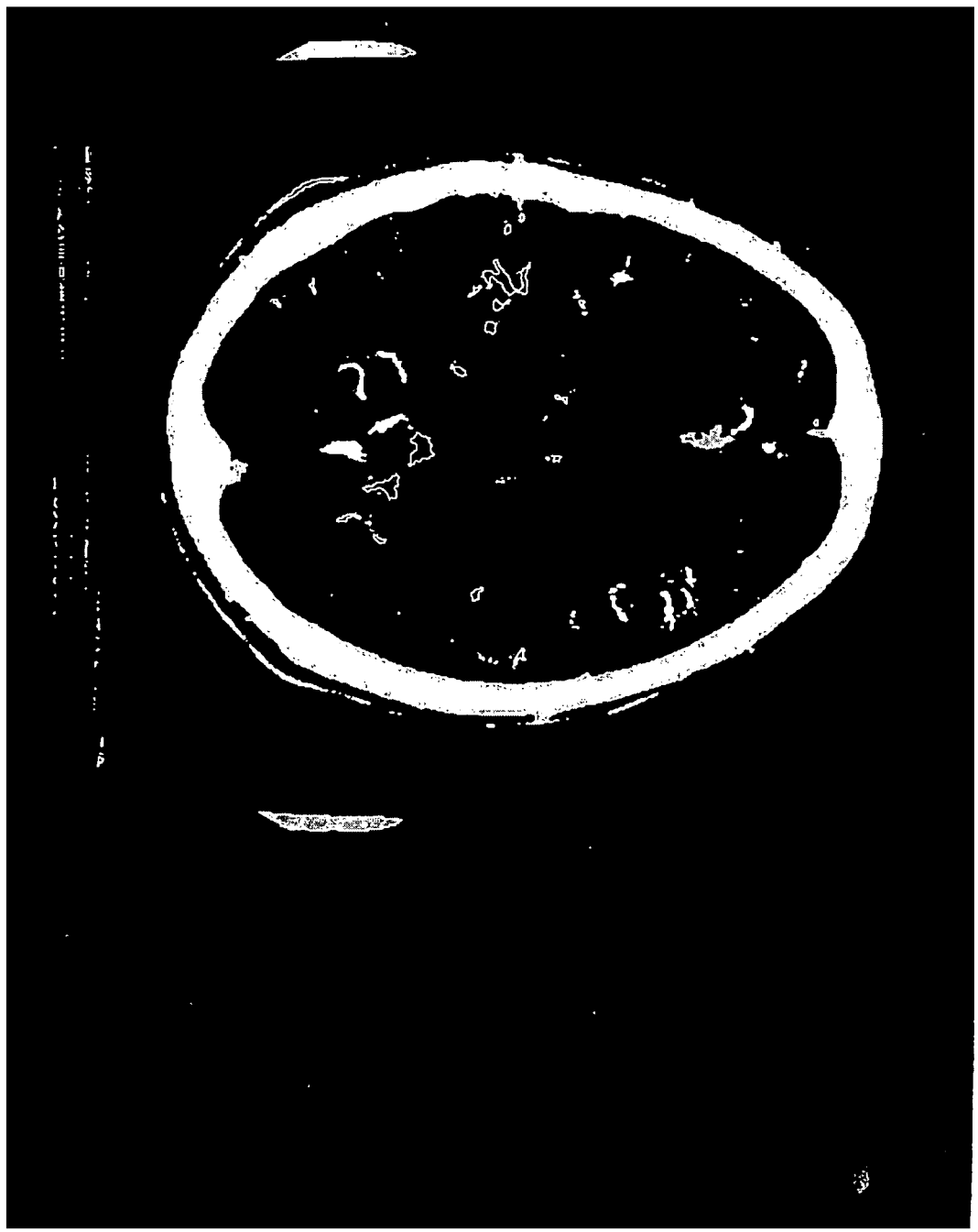

When the images of FIGS. 8(c) and 8(d) are compared, it is understood that the image of FIG. 8(c) obtained by subjecting the original image to only the threshold processing is difficult of blood vessel sampling based on a threshold value, whereas the image of FIG. 8(d) obtained by the threshold processing after the application of the coherent filter permits the blood vessel sampling based on the threshold value, without omitting even fine blood vessels.

Figure 8E:
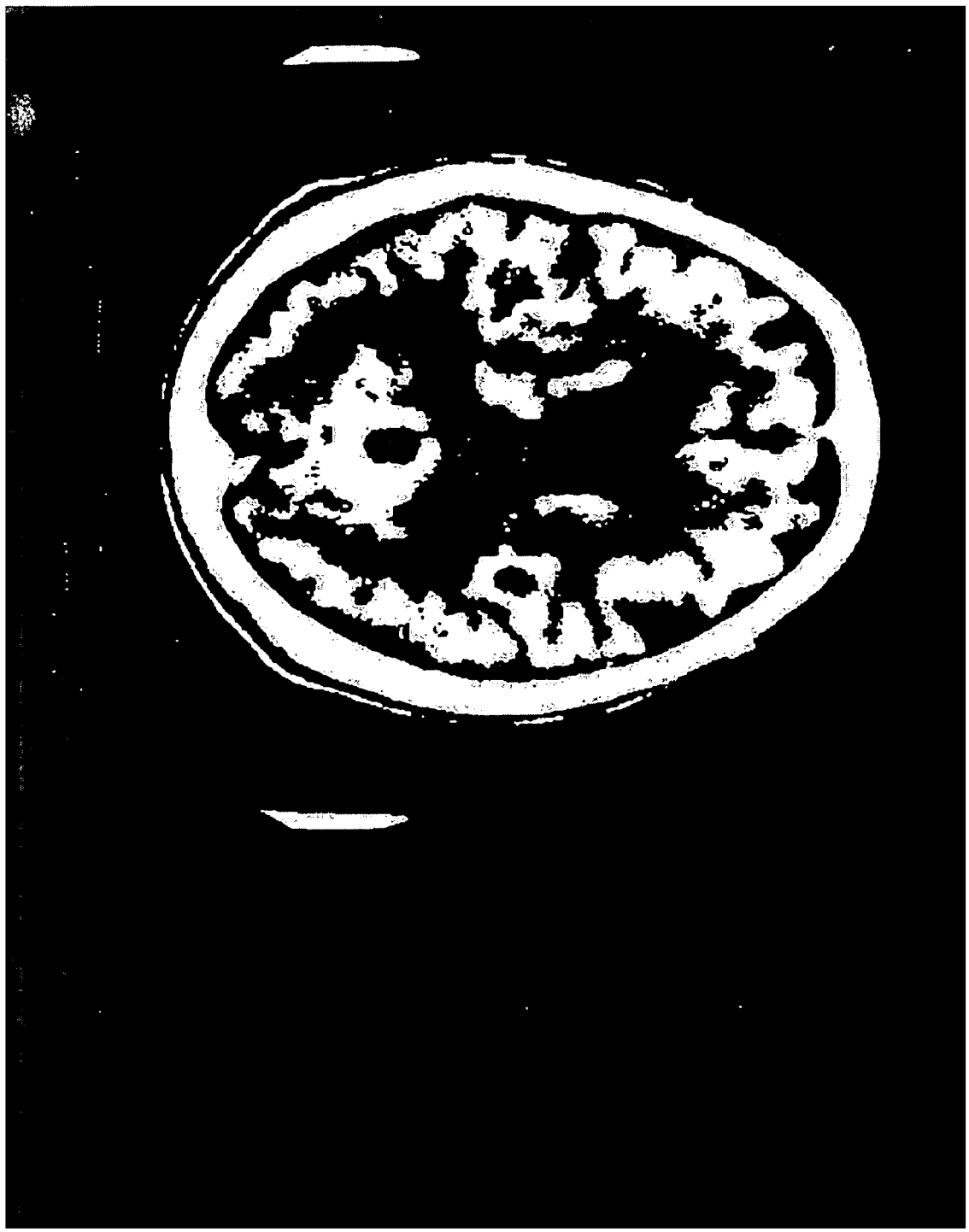

Besides, according to FIG. 8(e), it is understood that the region of the gray matter has been sampled.

Figure 9:
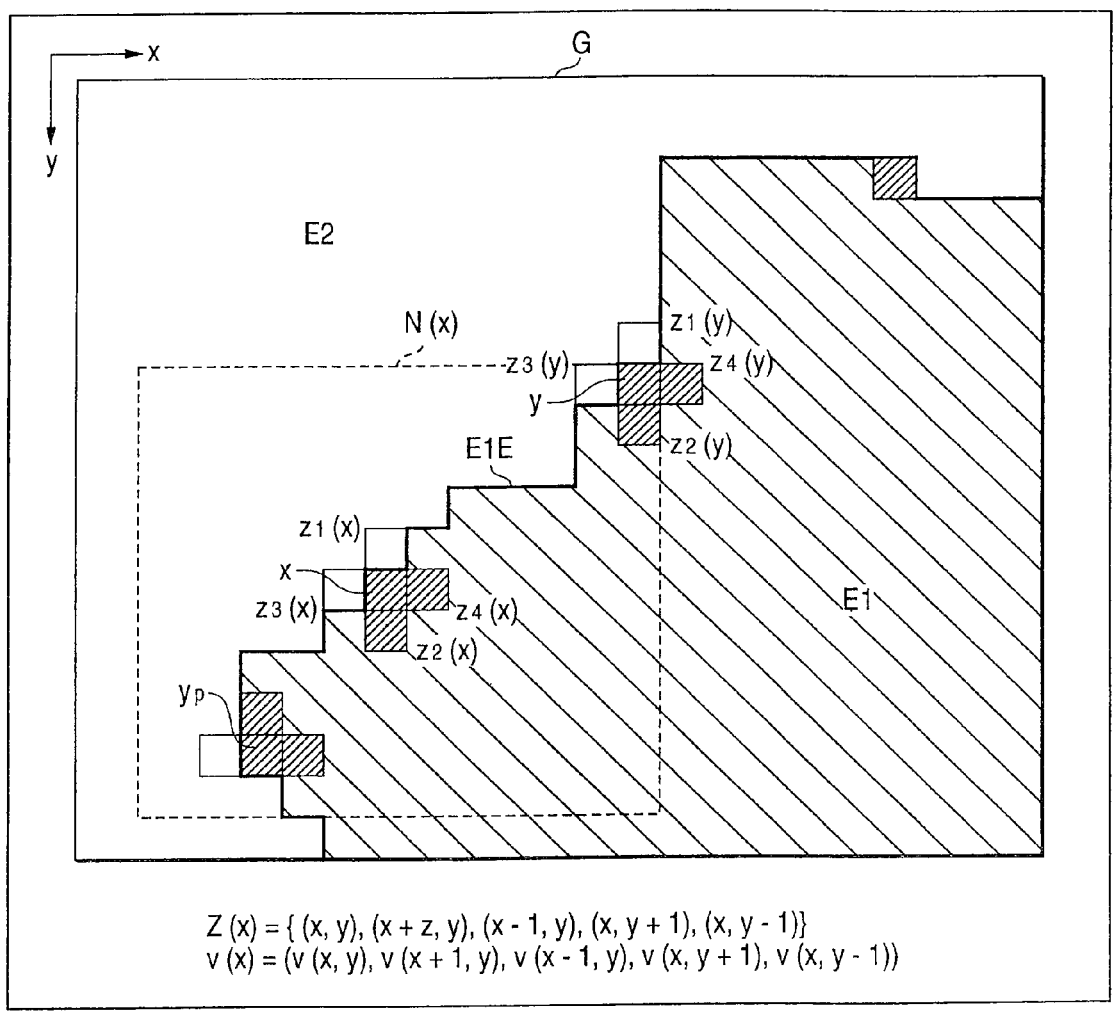
FIG. 9 is an explanatory diagram showing one example of a method of constructing a pixel value v(x) from a single image.

According to such a scheme, the effects as shown in FIG. 8 are really attained. Since, however, the unidimensional vector value v(x)=v(x) is used for measuring the goodness of fit between the pixels x and y, the performance of discrimination for the goodness of fit is comparatively low, in other words, only the critical probability p(x, y) which is statistically uncertain is obtained. Therefore, the effect of suppressing random noises without spoiling a resolution cannot be said considerably high. In such a case, accordingly, another scheme to be stated below should be adopted more preferably. Effective is the scheme wherein a multidimensional vector is constructed using a set Z(x) which consists of some pixels in the vicinity of the pixel x, so as to employ the multidimensional vector as the pixel value v(x) of the pixel x. By way of example, as shown in FIG. 9, let's consider a five-dimensional vector wherein, using the set Z(x) which consists of four pixels (x+1, y), (x−1, y), (x, y+1) and (x, y−1) adjoining the pixel x=(x, y) around it (hereinbelow, the pixels which are the elements of the set Z(x) around the pixel x shall be expressed as "$z_1(x)$, $z_2(x)$, $z_3(x)$ and $z_4(x)$"), the scalar values of the four pixels are added to the scalar value of the pixel x itself, namely, v(x)=v(x, y). That is:

$$v(x)=(v(x,y),v(x+1,y),v(x-1,y),v(x,y+1),v(x,y-1)) \quad (3.3)$$

Such vectors can be similarly constructed as to all pixels which constitute an image G shown in FIG. 9 (incidentally, FIG. 9 shows only a part of the whole image on an enlarged scale).

In this way, the coherent filter according to the present invention is constructed using the pixel value v(x) of the multidimensional vector constructed from the single image, whereby the goodness of fit can be decided at a higher precision than in the case of employing the pixel value of the unidimensional vector. As a result, the random noises can be suppressed more intensely without spoiling the resolution of the image.

By the way, in the case where the pixel value is thus constructed, the foregoing null hypothesis H for use in quantifying the goodness of fit, "the pixels x and y have the same pixel values when their noises are eliminated" signifies nothing but the null hypothesis H' that "the pixel x and the surrounding pixels $z_1(x)$-$z_4(x)$, totaling five, and the pixel y and the surrounding pixels $z_1(y)$–$z_4(Y)$, totaling five, have the same pixel values as those of the corresponding pixels except the noises, respectively".

More concretely, in a case where, as shown in FIG. 9, a certain pixel x and a certain pixel y which exists within a set Z(x) (this is, for example, an area around the pixel x as stated above) are both existent inside the region E of any object E1 which appears on an image G as shown in the figure by way of example, the value of the critical probability p(x, y) computed by, for example, Equation (9) becomes small, and the value of the weight w(p(x, y)) computed by, for example, Equation (6) becomes large. The reason therefor is that, in this case, pixels $z_2(x)$ and $z_4(x)$ and pixels $z_2(y)$ and $z_4(y)$ lie in the region of the image E1 of the particular object, while pixels $z_1(x)$ and $z_3(x)$ and pixels $z_1(y)$ and $z_3(y)$ lie in the image of an object E2, so vector values V(x) and V(y) expressed by Equation (3.3) are similar.

Now, in the above embodiment, when note is especially taken of the pixel x which lies at the edge of the image E1 of the object, it is conjectured that pixels y as to which the critical probability p(x, y) in the case of abandoning the null hypothesis H' is low will not usually be found in a very large number (in FIG. 9 by way of example, regarding even the pixel x and a pixel $y_p$ both of which exist inside the edge E1E of the image of the object E1, the critical probability p(x, y) in the case of abandoning the null hypothesis H' becomes higher as compared with the critical probability concerning the pixels x and y shown in the figure).

More generally speaking, regarding a pixel x existent at the edge of the image of a certain object, and most of y∈N(x), the value of the critical probability p(x, y) computed by, for example, Equation (9) becomes large, and the weight w(p(x, y)) computed by, for example, Equation (6) becomes small. Then, a smoothing effect is feeble even by weighted averaging, so that the noise suppression effect based on the coherent filter as computed by, for example, Equation (4) is scanty.

Therefore, another scheme with the above scheme further improved will be described below. In this scheme, a pixel value v(x) is constructed as:

$$v(x)=(v(x,y),v_1,v_2,v_3,v_4) \quad (3.4)$$

where $v_1$–$v_4$ are such that v(x+1, y), v(x−1, y), v(x, y+1) and v(x, y−1) in the above equation (3.3) are rearrayed in conformity with a predetermined rule (for example, in the order of larger values).

In this way, the null hypothesis H' turns into the more moderate null hypothesis H'' that "the pixel x and the surrounding pixels $z_1(x)$–$z_4(x)$, totaling five, and the corresponding pixel y and the surrounding pixels $z_1(y)$–$z_4(Y)$, totaling five, have the same pixel values except noises [while allowing the changes of sequences within the pixels $z_1(x)$–$z_4(x)$ and within the pixels $z_1(y)$–$z_4(Y)$], respectively (the contents in the brackets [ ] have been added).

Figure 10:
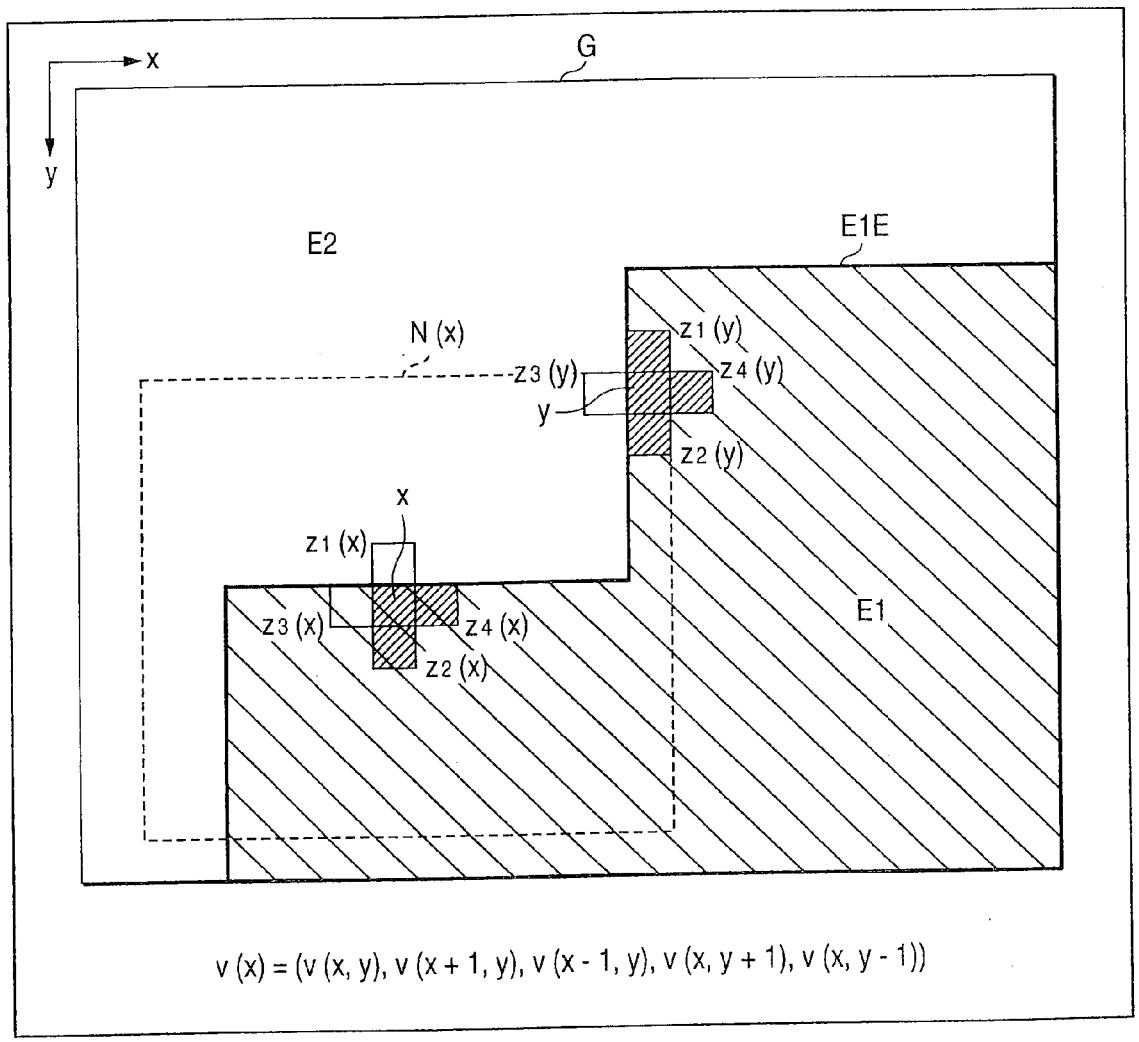
FIG. 10 is an explanatory diagram showing another example of the method of constructing a pixel value v(x) from a single image.

Besides, in this case, in the relationship between pixels x and y which exist inside the edge E2E of the image E2 of an object as shown in FIG. 10 by way of example, the critical probability p(x, y) in the case of abandoning the null hypothesis H'' becomes low (because the pixels $z_2(x)$, $z_3(x)$ and $z_4(x)$ and the pixels $z_1(y)$, $z_2(y)$ and $z_4(y)$ agree as $v_1$ through $v_3$ in the above equation (3.4), and the pixel $z_1(x)$ and the pixel $z_3(y)$ similarly agree as $v_4$), with the result that a noise suppression effect becomes greater than in the scheme based on the construction of the pixel value v(x) conforming to the above equation (3.3), and a spatial resolution is not spoilt.

As described above, in the present invention, a pixel value v(x) being a vector value can be constructed from a single image, so that noises can be suppressed without spoiling a spatial resolution, by employing the coherent filter. Since such a scheme suffices with the single image, it is generally applicable to any images fundamentally. That is, this scheme is applicable, not only to the foregoing various examples of applications (X-ray CT equipment, medical image diagnostic equipment, color images, etc.), but also to all images. Besides, even in a case where the image is a dynamic image (which can be seen as a plurality of static images as stated above several times), this scheme (in which "the pixel value v(x) is constructed from the single image") may, of course, be applied to each of the static images. Further, in case of employing this scheme for a three-dimensional or multidimensional image, a set Z(x) can be constructed of, for example, a pixel $\chi_1$ itself and six pixels lying in contact with the pixel $\chi_1$ Such expanding methods can be suggested very easily, and are self-explanatory.

By the way, in the present invention, the coherent filter may, of course, be constructed (as already stated) by using the pixel value v(x) which is constructed in accordance with each of the individual schemes "from a plurality of images", "from a plurality of sorts of images" and "from a single image" as shown in FIG. 2, but the coherent filter can also be constructed on the basis of a pixel value v(x) which is constructed by properly combining the respective schemes and which is expressed as a vector value of larger dimensions.

As already stated in the section VII, assuming by way of example that there are two color images concerning an identical subject, as to a certain pixel x, scalar values $v_R(x)$, $v_G(x)$ and $v_B(x)$ indicated on the right side of the above equation (2.2) are derived from the two images as the pixel value v(x) of the pixel x as is a six-dimensional vector:

$$v(x)=(v_{R1}(x),v_{G1}(x),v_{B1}(x),v_{R2}(x),v_{G2}(x),v_{B2}(x)) \quad (3.5)$$

When the pixel value v(x) expressed by a vector of larger dimensions is used in this manner, a more reliable value can be calculated as the critical probability p(x, y) which is computed by, for example, Equations (9) and (6). It is consequently permitted to suppress random noises more intensely without spoiling the resolution of the image.

(IX Most General Form of Coherent Filter in Embodiment)

Now, apart from the above description along FIG. 2, a more general form concerning the coherent filter introduced as in the above equation (4) will be described.

In the general form (Equation (4)) of the coherent filter, or the various examples of applications, there has been employed the null hypothesis H that "the pixels x and y have the same values when their noises have been removed" or that "v(x)=v(y) except differences ascribable to the noises of both the pixels" stated at the beginning, but this null hypothesis can be given a more general expression as stated below.

A model function f(a, v(y)) which includes an unknown M-dimensional parameter a=($a_1, a_2, \ldots, a_M$) (where M<K) is introduced, whereupon a null hypothesis $H_0$ "v(x)=f(a, v(y))+ξ (where ξ conforms to a (known) probability distribution)" is built up as to two certain vectors x and y which represent the positions of pixels. On this occasion, the estimative value ã of the parameter a is determined from v(x) and v(y) by employing a suitable fitting method (for example, the least squares method to be explained later), whereby the above null hypothesis can be said in other words as its equivalent proposition $H_0$ "v(x)=f(ã, v(y))+ξ (where ξ conforms to a (known) probability distribution)". Here, f(ã, v(y)) mentioned above is such that the pixel value v(y) of the pixel y is transformed so as to have the highest goodness of fit with the pixel value v(x) of the pixel x by optimally adjusting the degree of freedom (namely, the parameter a) allowed by a model which the function f describes. Besides, such an optimum parameter is ã.

As a result, a critical probability p(x, y) is permitted to be concretely computed using the known probability distribution (with which ξ is supposed to conform if the null hypothesis is correct), so that a weight w(p(x, y)) can be computed. Therefore, a weighted average $v'_k(x)$ can be computed by:

$$v'_k(x) = \frac{\sum_{y \in N(x)} w(p(x,y)) f(\tilde{a}, v(y))}{\sum_{y \in N(x)} w(p(x,y))} \quad (15)$$

This is the most general form of the coherent filter in this embodiment. Incidentally, when the above equation (4) and this equation (15) are compared, it is understood that the former is nothing but a more concrete form obtained by actually putting the following in the latter:

$$f(\tilde{a},v(y))=v(y) \quad (16)$$

(IX-1 Example of Application Based on Above Equation (15); Construction of Time-Density Curve Based on Dynamic Image)

There will be stated another example of application of the present invention employing the form of the coherent filter as indicated by Equation (15). Here, the example of application is an embodiment in which, in quantitatively measuring a time-density curve that handles the dynamic CT image obtained by the medical image diagnostic equipment, the time-density curve with random noises sufficiently suppressed is intended to be acquired by applying the present invention.

First, the "dynamic image" termed here is the combinations between a series of images (image Nos. 1, 2, ..., K) obtained by iteratively radiographing an identical subject, and the radiographing times ($t_1, t_2, \ldots, t_K$) of the respective images. It is, for example, the dynamic CT image obtained by the medical image diagnostic equipment, namely, the X-ray CT equipment 100, or it is radiographed by employing the fluoroscopic equipment, scintillation camera, MRI equipment, SPECT equipment or PET equipment, ultrasonic diagnostic equipment, or the like. In addition, the dynamic image may well be composed of a series of images obtained by iterative photographing with the general photographing equipment, namely, the digital camera, video camera, noctovision camera, fast photographing camera, or the like.

Besides, the "time-density curve" termed here is a curve which represents a change with the passage of time in the image density value of a specified part within the dynamic image. Especially in the medical image diagnostic equipment, for the purpose of examining the details of, e.g., a blood flow movement, a metabolic function in a human body tissue or the like, the change with the passage of time in, e.g., a contrast medium density in the specified tissue of the human body is measured as the time-density curve. Besides, in an astronomical observation or the like, for the purpose of analyzing, e.g., a change in the brightness of a specified celestial body, the time-density curve is utilized. When more formally stated, the "time-density curve" is expressed as a sequence of pairs $\{<t_k, d_k> (k=1, 2, \ldots, K)\}$ where $d_k$ denotes the density value of a certain part at a time $t_k$. Besides, in many applications of the time-density curve, the absolute value of the density value $d_k$ is not always necessary, but it suffices to obtain only an increment $(d_k-d_1)$ taken with reference to the first image 1. Further, in many of such applications, it suffices to obtain only data $A(d_k-d_1)$ proportional to the increment $(d_k-d_1)$ (where A denotes an unknown proportionality coefficient). In this case, accordingly, a sequence of pairs $\{<t_k, A(d_k-d_1)> (k=1, 2, K)\}$ is the time-density curve to-be-acquired.

In order to acquire such a time-density curve, the sequence of pairs $\{<t_k, v_k(x)>\}$ or $\{<t_k, A(v_k(x)-v_1(x)>\}$ may, in principle, be constructed using the scalar value $v_k(x)$ of a pixel x included in the part as to which the time-density curve is to be measured, in each of the images k (k=1, 2, ..., K) constituting the dynamic image.

In practical use, however, there is the problem that, since random noises are contained in the dynamic image obtained by the medical image diagnostic equipment or the like, the time-density curve to be originally measured cannot be precisely acquired.

Further, in the practical use, a so-called "partial volume effect" occurs in the dynamic image. The partial volume effect is the phenomenon that the image of a minute object within the subject or patient is expressed by a small number of pixels on the dynamic image, and that the small number of pixels are influenced by the image of adjacent objects in the subject, so the pixel values of the small number of pixels exhibit only small fluctuations (though they are proportional to the fluctuations of density values which are to be originally measured). In other words, the pixel values of the small number of pixels contain only slight signals. Accordingly, in the case where the partial volume effect occurs, the sequence of pairs $\{<t_k, v_k(x)>\}$ (k=1, 2, ..., K) has a very low signal level at any pixel x, and it is influenced by the change of a density value in a tissue which is not to be originally measured. Further, random noises are existent. These result in the problem that the time-density curve $\{<t_k, d_k>\}$ to be originally measured cannot be precisely acquired.

In order to suppress the random noises, therefore, a method based on temporal averaging has hitherto been employed as stated below. First, the sequence of pairs $\{<t_k, v_k(x)>$ (k=1, 2, ..., K)$\}$ is constructed concerning the pixel x which is included in the part to-be-measured. Subsequently, a temporal average value $v_k\#(x)$ is computed by, for example, the following:

$$v_k\#(x) = \frac{\sum_{j=m}^{n} v_{k+j}(x) G_j}{\sum_{j=m}^{n} G_j} \tag{17}$$

Besides, the temporal average value of times corresponding to the above temporal average value is computed by the following:

$$t_k\#(x) = \frac{\sum_{j=m}^{n} t_{k+j}(x) G_j}{\sum_{j=m}^{n} G_j} \tag{18}$$

(where m<n denotes suitable integers, and $G_j$ denotes a suitable weighting factor). Thereafter, a time-density curve $\{<t_k\#, v_k\#(x)>$ (k=1, 2, K)$\}$ is constructed and employed.

Alternatively, in order to suppress the random noises, a method based on spatial averaging has hitherto been employed as stated below. A set R of pixels as substantially corresponds to the part to-be-measured (that is, an ROI (Region of Interest) on the dynamic image) is set. In the image of No. k, the spatial average value $v_k(R)$ of the scalar values $v_k(x)$ of all pixels x∈R included in the set is calculated by Equation (19) given below. Thereafter, the sequence of pairs $\{<t_k, v_k(R)> (k=1, 2, \ldots, K)\}$ is constructed and is employed as the time-density curve.

$$v_k(R) = \frac{\sum_{x \in R} v_k(x)}{\sum_{x \in R} 1} \tag{19}$$

Further, there has been employed a scheme wherein the random noises are more suppressed by utilizing both the temporal averaging and the spatial averaging.

These prior-art schemes, however, have had the problems that, when the temporal averaging is executed, a temporal resolution is spoilt, and that, when the spatial averaging is executed, the changes with the passage of time in the densities of parts other than the part to be originally measured mix into a measurement value.

In order to solve such problems and to acquire a preciser time-density curve, the coherent filter according to the present invention can be applied on the basis of the section (IX Most general form of Coherent filter in Embodiment).

First, there will be explained a null hypothesis which is to be utilized in the coherent filter of this embodiment. Assuming that the true time-density curve at the part to be measured is $\{<t_k, d_k> (k=1, 2, \ldots, K)\}$, in a case where $\{<t_k, A(d_k-d_1)> (k=1, 2, \ldots, K)\}$ (where A denotes an unknown coefficient) being the linear transformation of the true time-density curve is intended to be measured, a set R of pixels as substantially corresponds to a part to-be-measured is set. If, as to any pixel x∈R being the element of the set R, a condition Q: "the pixel x reflects the true time-density curve favorably and is hardly influenced by the density changes with the passage of time in the other parts" is fulfilled, it can be assumed that Equation (20) given below holds by considering the influences of the partial volume effect and random noises as to a pixel value (being a vector value) $v(x)=(v_1(x), v_2(x), \ldots, v_K(x))$:

$$v_k(x)=p(x)d_k+q(x)+\gamma_k(x)$$

$$(k=1,2,\ldots,K) \quad (20)$$

Here, $p(x)$ and $q(x)$ denote unknown coefficients which differ every pixel x, but which do not change depending upon the image No. k (that is, the radiographing time $t_k$), and they are obtained by modeling the partial volume effect. Besides, $\gamma_k(x)$ is obtained by modeling the random noises. Although the value of $\gamma_k(x)$ differs every pixel x and every image No. k, the expected value thereof is 0 (zero), and the statistic distribution thereof depends upon neither the pixel x nor the image No. k. (By the way, in the ensuing description, a case where the statistic distribution is a normal distribution of average 0 and variance $\sigma^2$ shall be exemplified for the sake of brevity, but it is only required that the statistic distribution is substantially approximated by any known distribution, and how to modify the following embodiment so as to be suited to that case is obvious.)

Under the above assumptions, if the proposition that "both the pixels x and y satisfy the condition Q (mentioned above)" holds regarding any two pixels x and y which are the elements of the set R, it can be demonstrated that the relationship of the following equation holds:

$$v_k(x)=a_1 v_k(y)+a_2+\xi_k$$

$$(k=1,2,\ldots,K) \quad (21)$$

Here, $a_1$ and $a_2$ denote unknown coefficients which differ every combination x, y of the pixels, but which do not change depending upon the image No. k (that is, the radiographing time $t_k$). Besides, $\xi_k$ denotes the random noises, and the value thereof differs every pixel combination x, y and every image No., but the expected value thereof is 0.

Equation (21) is derived as stated below. When an equation obtained by substituting y into x in Equation (19):

$$v_k(y)=p(y)d_k+q(y)+\gamma_k(Y) \quad (22)$$

is reduced, the following is obtained:

$$d_k = \frac{v_k(y) - q(y) - \gamma_k(y)}{p(y)} \quad (22')$$

By substituting this equation into Equation (20), the following is obtained:

$$v_k(x) = \frac{p(x)}{p(y)}v_k(y) + \left(q(x) - \frac{p(x)}{p(y)}q(y)\right) + \left(\gamma_k(x) - \frac{p(x)}{p(y)}\gamma_k(y)\right) \quad (23)$$

Accordingly, Equation (21) is derived by putting:

$$\left.\begin{array}{l} a_1 = \dfrac{p(x)}{p(y)} \\[4pt] a_2 = q(x) - \dfrac{p(x)}{p(y)} \\[4pt] \xi_k = \gamma_k(x) - \dfrac{p(x)}{p(y)}\gamma_k(y) \end{array}\right\} \quad (24)$$

Here, $a_1$ and $a_2$ in Equation (24) denote parameters which represent the partial volume effect, and $\xi_k$ in the same denotes random noises.

It has been indicated from the above that the proposition that "the pixels x and y both satisfy the condition Q" is equivalent to the null hypothesis $H_0'$ that "$v_k(x)=a_1 v_k(y)+a_2+\xi_k$ (k=1, ..., K) holds".

Next, there will be explained a method for transforming the null hypothesis $H_0'$ that "$v_k(x)=a_1 v_k(y)+a_2+\xi_k$ (k=1, ..., K) holds", into a proposition in a form which is, in effect, equivalent thereto and which can be actually tested. When this null hypothesis is stated in a mathematically strict expression anew, it becomes the null hypothesis $H_0'$ that "certain constants $a_1$ and $a_2$ exist, and that $\xi_k=v_k(x)-a_1 v_k(y)-a_2$ (k=1, ..., K) conforms to a normal distribution of average 0 and variance $(\sigma^2 h(a_1))$". Here, a coefficient $h(a_1)$ is:

$$h(a_1)=1+a_1^2 \quad (25)$$

(Equation (25) is immediately derived from Equation (24) which gives the definitions of $a_1$ and $\xi_k$, and a general property which a variance concerning a random variable has.) Besides, the value of the above variance $\sigma^2$ can be estimated conveniently and satisfactorily precisely in practical use, by the method stated in, e.g., the foregoing section (III Case 1 of Applying Present invention to X-ray CT radiography; Dynamic CT radiography (To obtain Plurality of images of Reduced noises)).

As understood from the above, if the constants $a_1$ and $a_2$ can be determined, it is possible to test the null hypothesis $H_0'$. Herein, it is actually sufficient that the optimum estimative values $a_1^\sim$ and $a_2^\sim$ of these constants are obtained.

A known fitting method can be directly utilized for calculating such optimum estimative values of the constants $a_1$ and $a_2$. In the ensuing description, therefore, a case of employing a linear least squares method shall be outlined as a typical concrete example of such a fitting method. In applying the linear least squares method to this embodiment, the sum-of-squares of $\xi_k$ in the above null hypothesis is merely defined as $S(a)$ as follows:

$$S(a) = \sum_{k=1}^{K}\{v_k(x) - a_1 v_k(y) - a_2\}^2 \quad (26)$$

The value of the sum-of-squares $S(a)$ depends upon a constant vector $a=(a_1, a_2)$, that is, the values of the constants $a_1$ and $a_2$. When the constant vector a according to which the sum-of-squares $S(a)$ takes the least value is calculated, the optimum estimative values $a_1^\sim$ and $a_2^\sim$ in the sense of unbiased estimation concerning the constants $a_1$ and $a_2$ are obtained. Incidentally, various known methods can be utilized for the concrete computational method of the linear least squares method, and moreover, any of the known computational methods is very simple and requires a very slight computing time period.

In this way, the optimum estimative values $a_1^\sim$, $a_2^\sim$ of the constants $a_1$, $a_2$ have been calculated, with the result that a residual defined by the following equation can be concretely computed:

$$r_k^\sim(x,y) = v_k(x) - a_1^\sim v_k(y) - a_2^\sim \quad (27)$$

Using the residual $r_k^\sim$, accordingly, the above null hypothesis $H_0'$ can be said in other words as a null hypothesis $H_0''$ being, in effect, equivalent thereto, that "$r_k^\sim(x,y)$ (k=1, ..., K) conforms to a normal distribution of average 0 and variance $(1+(a_1^\sim)^2)\sigma^2$". This is a concrete proposition which permits the computations of testing to be actually executed.

Further, the null hypothesis $H_0'$ is said in other words by introducing vectorial expressions:

$$\begin{aligned} a^\sim &= (a_1^\sim, a_2^\sim) \\ \xi &= (r_1^\sim, \ldots, r_K^\sim) \end{aligned} \quad (28)$$

(where the vectors a and ξ depend upon the combination x, y of the pixels) and employing a vector value function f defined by the following equation:

$$f(a^\sim, v(y)) = a_1^\sim v(y) + a_2^\sim \quad (29)$$

Then, the null hypothesis $H_0''$ becomes "$v(x) = f(a^\sim, v(y)) + \xi$ (where ξ conforms to a normal distribution of average 0 and variance $(1+(a_1^\sim)^2)\sigma^2$)", and this is in quite the same form as that of the null hypothesis $H_0$ stated in the section (IX Most general form of Coherent filter in Embodiment). It is accordingly apparent that this embodiment is one modification of the coherent filter according to the present invention. Incidentally, the function $f(a^\sim, v(y))$ here signifies that parameter a representative of the partial volume effect which has been optimally adjusted for the pixel value v(y) of the pixel y and transformed so as to have the highest goodness of fit with the pixel value v(x) of the pixel x.

Next, there will be explained a method in which, in this embodiment, a time-density curve is acquired by the coherent filter with the above null hypothesis $H_0''$. Regarding a set R of pixels substantially corresponding to a part to-be-measured, computations to be stated below are executed for a certain pixel x∈R included in the set R, relative to all pixels y∈R being the elements of the set R. A residual $r_k^\sim(x, y)$ (k=1, ..., K) is actually calculated using the above method. Subsequently, a critical probability p(x, y) or a weight w(p(x, y)) in the case of abandoning the above null hypothesis $H_0''$ that "$r_k^\sim(x, y)$ (k=1, ..., K) conforms to a normal distribution of average 0 and variance $(1+(a_1^\sim)^2)\sigma^2$" is concretely computed in accordance with Equation (6). Besides, a weighted average $v'_k(x)$ is computed in accordance with the following equation (15') so as to construct a time-density curve $\{<t_k, v'_k(x) - v'_1(x)>$ (k=1, 2, K)$\}$ at the pixel x.

$$v'(x) = \frac{\sum_{y \in R} w(p(x,y)) f(a^\sim, -v(y))}{\sum_{y \in R} w(p(x,y))} \quad (15')$$

The time-density curve thus obtained is a measurement value which approximates $\{<t_k, A(d_k - d_1)>\}$ (where A denotes an unknown coefficient) being the linear transformation of a true time-density curve $\{<t_k, d_k>\}$ at the pixel x, and it has had random noises suppressed by the effect of the weighted average based on Equation (15). Besides, the pixel value vector of the other pixel y for use in the computation based on Equation (15) has had the influence of the partial volume effect compensated as understood from the equation. Further, this embodiment has the property that "a temporal average is not used at all, and that a spatial average is computed using a weight based on the goodness of fit with the pixel x" as is the common feature of the coherent filter. Accordingly, the time-density curve which does not have a temporal resolution spoilt, which has the influence of the partial volume effect suppressed and which has the random noises suppressed can be obtained by this embodiment. Incidentally, the scheme for acquiring the time-density curve in this way shall be especially termed "coherent regression method".

Next, there will be concretely explained an example of the clinical utilization of a time-density curve in a dynamic image obtained in, e.g., dynamic CT radiography in X-ray CT for medical treatment. In this example of application, while a contrast medium is being rapidly injected into a blood vessel, the radiographing of dynamic CT or the like is performed, and the density change of the image of an artery existing in a human body tissue is measured as the time-density curve, thereby to intend the diagnosis of a blood flow movement in the tissue.

In this example of application, the artery in the human body tissue is generally very fine in many cases, and hence, the image of the artery appearing on a tomogram based on the CT undergoes the partial volume effect. Further, random noises are, of course, contained in the image. With the prior-art method, therefore, it is difficult to obtain a satisfactorily precise time-density curve concerning the artery. When a time-density curve is daringly measured, it has been possible to obtain only measurement values $<t_k, (v_k(x) - v_1(x))>$ which somewhat approximate the linear transformation $<t_k, A(D_k - D_1)>$ of a true time-density curve $<t_k, D_k>$ concerning the artery (where $D_k$ denotes the pixel values (being scalar values) of a group of pixels corresponding to the image of the artery, at a time $t_k$, and k=1, 2, ..., K holds). The measurement values contain random noises. Besides, the coefficient A remains unknown because of the influence of the partial volume effect.

Therefore, when the above scheme according to the present invention is applied, it is possible to obtain measurement values $<t_k, (v'_k(x) - v'_1(x))>$ (k=1, 2, ..., K) which satisfactorily approximate the linear transformation $<t_k, A(D_k - D_1)>$. On the other hand, veins which can be observed on the same tomogram include considerably thick ones. Regarding such a vein, accordingly, the satisfactorily good approximate values $<t_k, (J_k - J_1)>$ (k=1, 2, ..., K) of the time-density curve can be obtained by the prior-art method. Here, $J_k$ denotes the pixel values of a group of pixels corresponding to the image of the vein, at a time $t_k$.

Meanwhile, as to time-density curves concerning blood circulation, there has been known the inherent property of the proposition S: that "if a contrast medium density in blood is 0 (zero) at a time $t_1$, the areas under curves (AUCs) agree in the time-density curves $<t_k, (d_k - d_1)>$ concerning any blood vessels d". The "area under curve" mentioned here signifies the integral of the time-density curve $<t_k, (d_k - d_1)>$ with respect to the time t.

Accordingly, the area-under-curve AUC(d) of the time-density curve $<t_k, (d_k - d_1)>$ concerning a certain blood vessel d can be approximately computed by, for example, the following equation:

$$AUC(d) \cong \sum_{k=1}^{K-1} \frac{\{(d_{k+1} - d_1) + (d_k - d_1)\}(t_{k+1} - t_k)}{2} \quad (30)$$

Thus, an area-under-curve AUC(J) concerning the time-density curve $\{<t_k, (J_k-J_1)>\}$ obtained as to the vein by the prior-art method can be computed using Equation (30) (J may be substituted into d). Besides, regarding the artery, if a time-density curve $\{<t_k, (D_k-D_1)>\}$ is known, an area-under-curve AUC(D) can be similarly computed using Equation (26). Moreover, the following ought to hold in accordance with the above proposition S:

$$AUC(D) \cong AUC(J) \quad (31)$$

In actuality, however, the time-density curve $<t_k, (D_k-D_1)>$ is unknown, and hence, the area-under-curve AUC(D) cannot be computed.

In contrast, the time-density curve $<t_k, (v'_k(x)-v'_1(x))>$ obtained by the scheme according to the present invention approximates $<t_k, A(D_k-D_1)>$, and the latter includes the unknown coefficient A. Therefore, an area-under-curve AUC (v') which can be concretely computed from the curve $\{<t_k, (v'_k(x)-v'_1(x))>\}$ by using Equation (30) must be A times as large as the area AUC(D). That is:

$$AUC(v') \cong A \cdot AUC(D) \quad (32)$$

From Equations (31) and (32), the following relationship holds:

$$A \cong AUC(v')/AUC(J) \quad (33)$$

Since the right side of Equation (33) can be concretely computed using Equation (30), the value of the coefficient A having been unknown can be concretely determined. Therefore, when a time-density curve $<t_k, (v'_k(x)-v'_1(x))/A>$ is constructed using the value of the coefficient A, it is nothing but approximating the time-density curve $<t_k, (D_k-D_1)>$ of the artery. The method of constructing the time-density curve for which the value of the proportionality coefficient A having been unknown is determined, by using the area-under-curve in this manner, shall be called "AUC method".

As thus far described, in the clinical utilization of a time-density curve in a dynamic image obtained by dynamic CT radiography or the like, the AUC method is further combined with the coherent regression method, whereby measurement values from which the influences of the partial volume effect and random noises are excluded and which do not include the unknown proportionality coefficient A are obtained concerning even the time-density curve of a fine artery the measurement of which has been difficult or impossible with the prior-art method.

Incidentally, the AUC method can, of course, be singly applied to the time-density curve $<t_k, (v'_k(x)-v'_1(x))>$ concerning the artery measured by the prior-art method, and the time-density curve for which the value of the proportionality coefficient A having been unknown is determined can be constructed (though the influences of the random noises and partial volume effect cannot be excluded).

Figure 11:
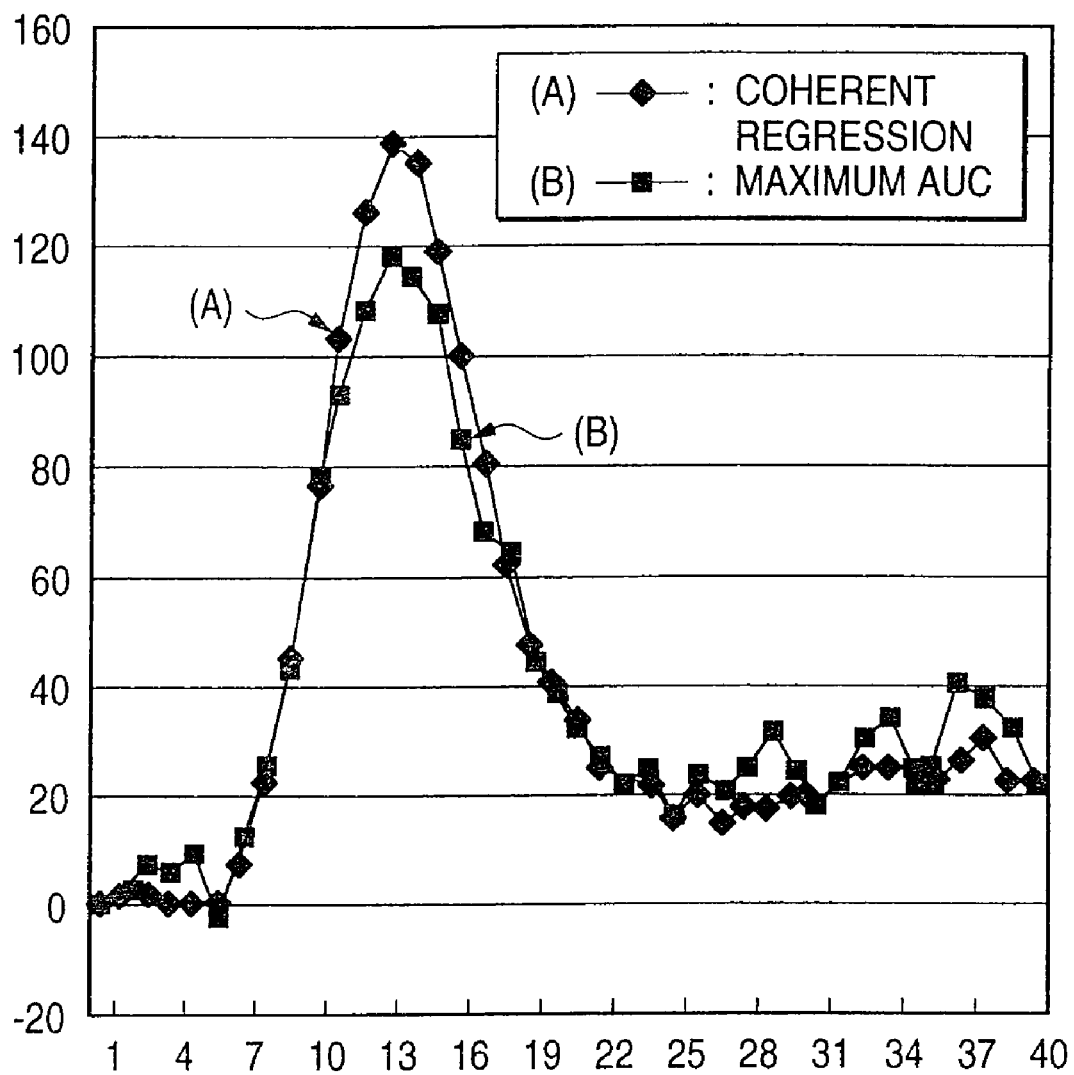
FIG. 11 is a graph showing a time-density curve in the case of combining a coherent regression method and an AUC method, and the curve in the case of combining a prior-art method and the AUC method.

A time-density curve obtained by further combining the AUC method with the coherent regression method becomes, for example, as indicated by a sign (A) in FIG. 11 as to a certain pixel x. By the way, a time-density curve constructed by the prior-art method, to which the AUC method is singly applied, is also indicated at (B) in the figure. It is understood that, in the curve (B), the influence of random noises is clearly seen, whereas in the curve (A), the noises are sufficiently suppressed, with a temporal resolution not spoilt at all.

Incidentally, although the scalar value $d_k$ has been used as the density value of the time-density curve in the above description, this embodiment is not restricted to such a case. Needless to say, this embodiment can be easily expanded and applied also to a case, for example, where individual images constituting a dynamic image are color images, more generally the combination of a multiple sorts of images, and where the density value of a time-density curve is expressed as a vector value.

(X Supplementary Items of Embodiments)

Now, the supplementary items of the embodiments thus far described will be described.

(X-1 General Supplementary Items)

First, in the foregoing embodiments, the "critical probability" p(x, y) in the case of abandoning the null hypothesis H has been supposed as means for quantifying the "goodness of fit" termed in the present invention, but the present invention is not restricted to such an aspect. As stated at the beginning, the "goodness of fit" may be a numerical "index" which represents whether or not the pixels x and y are similar in any sense.

Besides, in this regard, the $\chi$-square test method has been employed above in order to calculate the critical probabilities in the case of abandoning the several null hypotheses (refer to Equations (6) and (9)), but the present invention is not restricted thereto. In other words, the present invention is not restricted to only the aspect of utilizing the "statistical testing method" or the "$\chi$-square test method" which is one sort of the concrete aspects thereof.

Further, in the foregoing embodiments, the weight functions totaling two sorts, w1(Equation (10) into which Equation (6) or (9) has been substituted) and w3 (Equation (14)) have been mentioned as the concrete form of the weight function w(p(x, y)), but the present invention is not restricted thereto. As already stated, the property which is to be satisfied by the weight function w being the function of the critical probability p(x, y)∈[0, 1] is only the fact that the weight function w(t) is the non-negative monotonously increasing function defined in a domain t∈[0, 1]. Besides, most generally speaking, the weight function w may be the "non-negative monotonously increasing function which concerns the goodness of fit".

(X-2 More General Aspect Concerning Goodness of Fit)

The "goodness of fit" termed in the present invention is not restricted to the scheme as stated above wherein it is numerically given in accordance with the critical probability p(x, y) in the case of abandoning the null hypothesis. Accordingly, the "weight" is not restricted, either, to the scheme wherein it is calculated by exerting the weight function w on the critical probability p(x, y). In the ensuing description, more general aspects concerning such goodness of fit, etc. shall be explained along practicable examples.

First, to sum up generally, the present invention adopts a construction wherein, regarding a certain proposition appropriately set in conformity with the purpose of image processing, a certainty at which the proposition holds in an image to-be-processed is numerically given by an appropriate scheme conforming to the purpose, and the numerical value is subsequently applied to the image processing. By way of example, in order to numerically give the goodness of fit between a pair of pixels x and y, a more moderate scale may well be constructed in the present invention. As a practical example thereof, there is considered a construction wherein the goodness of fit is numerically given by utilizing a membership function in fuzzy logic or the like.

(X-2-1 Example of Applying Present Invention to Pattern Recognition)

Here, as a practicable example a more general aspect concerning the goodness of fit, etc., there will be explained one example in the case of applying the present invention to so-called "pattern recognition" which identifies and extracts a featuring pattern on an image.

In this case, on the basis of the feature of a pattern which is to be identified, a function m(x) which represents the certainty of the proposition that "a pixel x is a pixel constituting the pattern" is defined beforehand. Here, m(x)∈[0, 1] is held. In more detail, the function m(x) is a function which calculates a numerical value representative of the certainty of the proposition from a vector value v(x) being the pixel value of the pixel x, the pixel value v(y) of each pixel y included in a set N(x) of pixels lying in the vicinity of the pixel x, a vector x itself representative of the position of the vector, and so forth. Accordingly, the function m(x) needs to be appropriately set in accordance with the difference between the pattern which is to be extracted and a pattern which is not to be extracted. Besides, a weight function is defined by:

$$w(T, t) = \begin{cases} 1 : \text{for } t > T \\ 1 : \text{for } t \leq T \end{cases} \quad (34)$$

Besides, when a set X of pixels as to which the function m(x) is larger than a certain "threshold value" is constructed, the region of the pixel x corresponding to the pattern is obtained.

Now, when an image P to be processed is given, w(T, m(x)) in which a concrete threshold value T and the function m(x) are substituted into the above weight function is computed as to all the pixels x of the image. (Thus, the set X whose membership function is w(T, m(x)) (that is, the set of the pixels x as to which w(T, m(x))=1 holds) is defined, and this set X is nothing but the region occupied by the pattern on the image P.) Further, a new image P' is generated as stated below. The pixel x of the image P' has v(x) as its pixel value when the function w(T, m(x))=1 holds, and it has 0 (zero vector) as its pixel value in any other case. The image P' thus created is such that the pixel values of pixels which do not correspond to the pattern to-be-identified are erased from the image P by 0.

Of course, the processing steps of computing the function m(x), computing the weight w(T, m(x)) and constructing the image P' may well be respectively executed in sequence, or they can also be executed by software in which these processing steps are integrated.

In this example, the function m(x) numerically gives the "goodness of fit" between the pattern and the pixel x by checking the feature of the pattern, the vector value v(x) being the pixel value of the pixel x, and the value of the vector x itself. Besides, the weight w(T, m(x)) is calculated by the weight function defined by Equation (34), and the new image P' being the processed result is constructed using this weight and the image P.

As a further practicable example concerning this processing, there will be described the construction of image processing for extracting a fine line in an aerial photograph, the microphotograph of a metal surface, or the like.

First, there will be explained a method for constructing an index which numerically represents the certainty of the proposition that "a pixel x is a pixel constituting the fine line". A set N(x) of pixels lying in the vicinity of the pixel x is defined beforehand. Typically, the set N(x) may be defined as a rectangular area which centers around the pixel x. Also defined is a multidimensional vector value v(x) in which the pixel values (scalar values or vector values) of the individual pixels in the set N(x) are arrayed. The number of dimensions of the vector is denoted by K. Typically, the number K is preferably set at about 25-169.

Subsequently, a normalization function nrm being a K-dimensional vector function which is auxiliarily used in later computations is defined as stated below.

The normalization function nrm is given for any K-dimensional vector v subject to v≠0, as follows:

$$nrm_k(v) = \frac{v_k - \frac{1}{K}\sum_{i=1}^{K} v_i}{\sqrt{\sum_{j=1}^{K}\left(v_j - \frac{1}{K}\sum_{i=1}^{K} v_i\right)^2}} \quad (35)$$

where k=1, 2, ..., K holds. Owing to this normalization function, it is guaranteed that the following holds for any K-dimensional vector v (as long as the vector v is not a zero vector):

$$\sum_{i=1}^{K} nrm_k(v) = 0$$

$$\sum_{i=1}^{K} \{nrm_k(v)\}^2 = 1$$

Subsequently, one pixel x is determined at will, and typical examples of images each of which has a background of 0 (zero) and includes only one fine straight line passing through the pixel x are collected in a suitable number J and have image Nos. 1, 2, ..., J assigned thereto. The value of v(x) in the image of image No. j is computed, thereby to concretely construct a vector r(j) in accordance with the following equation:

$$r(j)=nrm_j(v(x))$$

Such computations are executed as to j=1, 2, J. (The J vectors r(j) thus constructed shall be called "pattern vectors" below. Incidentally, the pattern vector corresponds to the "pixel value separately constructed" termed in the present invention.)

Besides, a function m(x) is defined by the following equation:

$$m(x)=\max\{r(j)\cdot nrm(v(x))|j=1,2,\ldots,J\}$$

Here, "·" denotes the inner product between the K-dimensional vectors, and "max" denotes a function for deriving the maximum value in the elements of the set. The function m(x) thus constructed takes a large value in a case where the pixel x matches with or is similar to any of the pattern vectors r(j) (j=1, 2, ..., J), and it takes a small value in any other case. Therefore, this function m(x) is the index which numerically represents the certainty of the proposition that "the pixel x is a pixel constituting the fine line", that is, a function which represents the "goodness of fit". Further, a weight function is defined by:

$$w(T, t) = \begin{cases} 1 : \text{for } t > T \\ 0 : \text{for } t \leq T \end{cases} \quad \text{(34 mentioned again)}$$

Here, T denotes a constant which serves as a threshold value, and as which a suitable value is set.

Now, when an image P to be processed is given, w(T, m(x)) in which a concrete threshold value T and the function m(x) are substituted into the above weight function is computed as to all the pixels x of the image. (Thus, the set X whose membership function is w(T, m(x)) (that is, the set of the pixels x as to which w(T, m(x))=1 holds) is defined, and this set X is nothing but a region occupied by the pattern on the image P.)

Further, a new image P' is generated as stated below. The pixel x of the image P' has v(x) as its pixel value when the function w(T, m(x))=1 holds, and it has 0 (zero vector) as its pixel value in any other case. The image P' thus created is such that the pixel values of pixels which do not correspond to the pattern to-be-identified are erased from the image P by 0.

Besides, w(T, t) may well be constructed as a fuzzy discrimination function, for example:

$$w(T, t) = \begin{cases} \left(3\left(\frac{t}{T}\right)^2 - 2\left(\frac{t}{T}\right)^3\right)^C & \text{for } 0 \leq \frac{t}{T} \leq 1 \\ 0 & \text{for } \frac{t}{T} < 0 \\ 1 & \text{for } \frac{t}{T} > 1 \end{cases}$$

(where C denotes a positive constant), and the pixel x of the image P' may well be constructed so as to have w(T, m(x)V(x)) as its pixel value. This lowers the contrast of a pixel which is judged as not considerably corresponding to the "fine line", by the fuzzy logic, thereby to produce the effect of constructing the image P' so that the part of the "fine line" may stand out in relief.

(X-3 Supplementary Items Concerning Estimation Method for Variance $\sigma^2$)

Next, supplementary description will be made on a method of estimating the variance $\sigma^2$ (or standard deviation $\sigma$) for use in the above equation (6) or (14).

In the foregoing "Case of Applying Present invention to X-ray CT radiography", in the light of the background that the expected value $E[\sigma^2]$ of the variance obtained by the above equations (6) and (7) is proper for all the pixels x on all the K images, this expected value $E[\sigma^2]$ has been indiscriminately used for all the pixels x. However, there is also a case where such a premise is not satisfied, that is, a case where, as to the respective pixels x (which are $x_1, \ldots,$ and $x_F$ here), peculiar variances $\sigma^2(x_1), \ldots,$ and $\sigma^2(x_F)$ are generally supposed (even if the shapes of distributions are identical (for example, a Gaussian distribution)).

On such an occasion, the expected values $E[\sigma^2(x_1)], \ldots,$ and $E[\sigma^2(x_F)]$ of variances may well be calculated individually for the respective pixels x in accordance with the above equations (6) and (7). Thereafter, the expected values $E[\sigma^2(x_1)], \ldots,$ and $E[\sigma^2(x_F)]$ individually calculated in this manner may be substituted into Equation (3) in correspondence with the respective cases (=in correspondence with the pixels $x_1, \ldots,$ and $x_F$ noticed) so as to obtain $v'(x)=(v'_1(x), v'_2(x), \ldots, v'_K(X))$.

Besides, in a case where noises contained in the pixel values of all pixels are supposed to have a common variance $\sigma^2$, a scheme as stated below can be adopted for estimating the variance $\sigma^2$. First, as to the set Q of all pixels x $(=\{x_1, \ldots, x_F\})$, the average $(\sigma^2)^+$ of the expected values $E[\sigma^2(x)]$ of variances as calculated by the above equations (7) and (8) is obtained, and it is used as the first approximation of the estimative value of $\sigma^2$ in Equation (6). That is:

$$(\sigma^2)^+ = \frac{1}{|\Omega|} \sum_{x \in \Omega} E[\sigma^2(x)] \quad (35)$$

In the above equation, $|\Omega|$ denotes the number of the elements of the set $\Omega$ (here, $|\Omega|$=F holds). Subsequently, M is let denote a set of pixels x as to which the expected values $E[\sigma^2(x)]$ lie within, for example, several times the above average value $(\sigma^2)^+$. When $(\sigma^2)^{++}$ is let denote a new average taken for only the pixels x which are the elements of the set M, it becomes:

$$(\sigma^2)^{++} = \frac{1}{|M|} \sum_{x \in M} E[\sigma^2(x)] \quad (36)$$

This average can be utilized as the more likely estimative value of $\sigma$.

Figure 12:
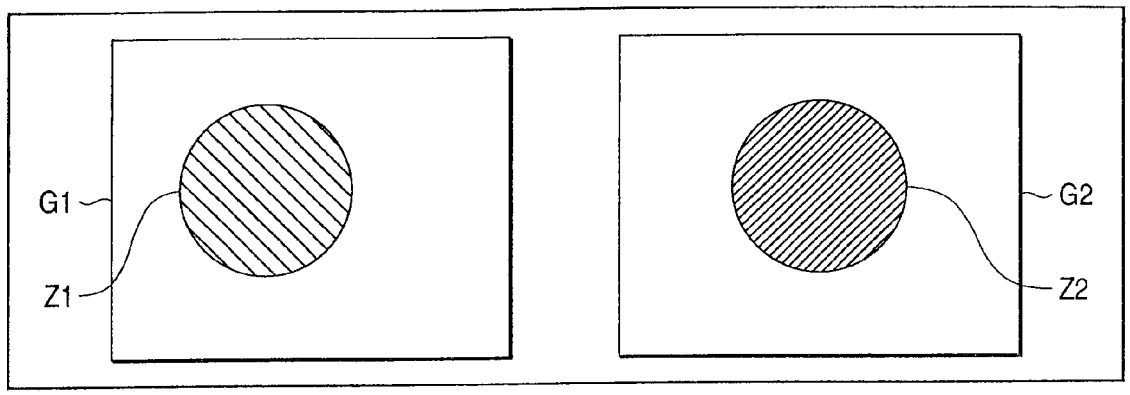
FIG. 12 relates to another estimation method for a variance $\sigma^2$ in Equation (4), etc. in the body of the specification, and is an explanatory diagram for explaining a calculation method for a variance $\sigma^{2++}$ based on the other estimation method.
Figure 12:
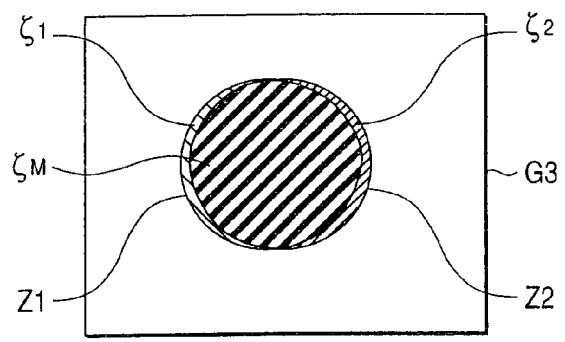
Figure 12:
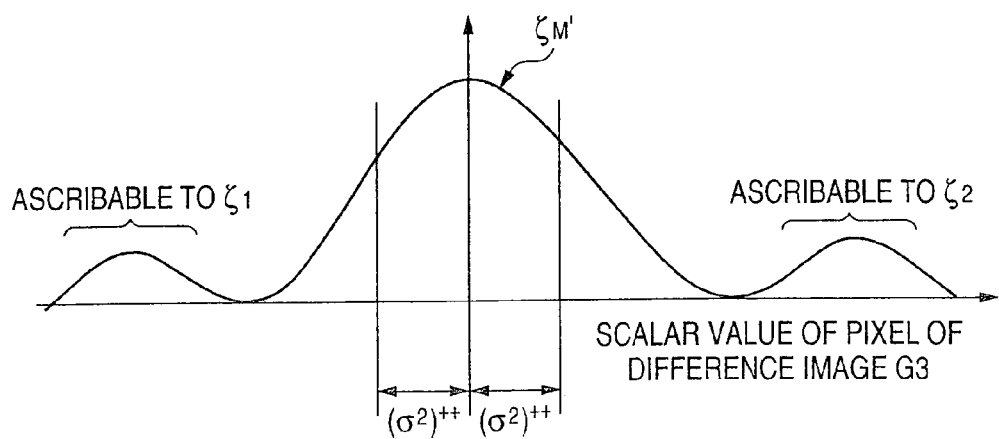
Figure 13:
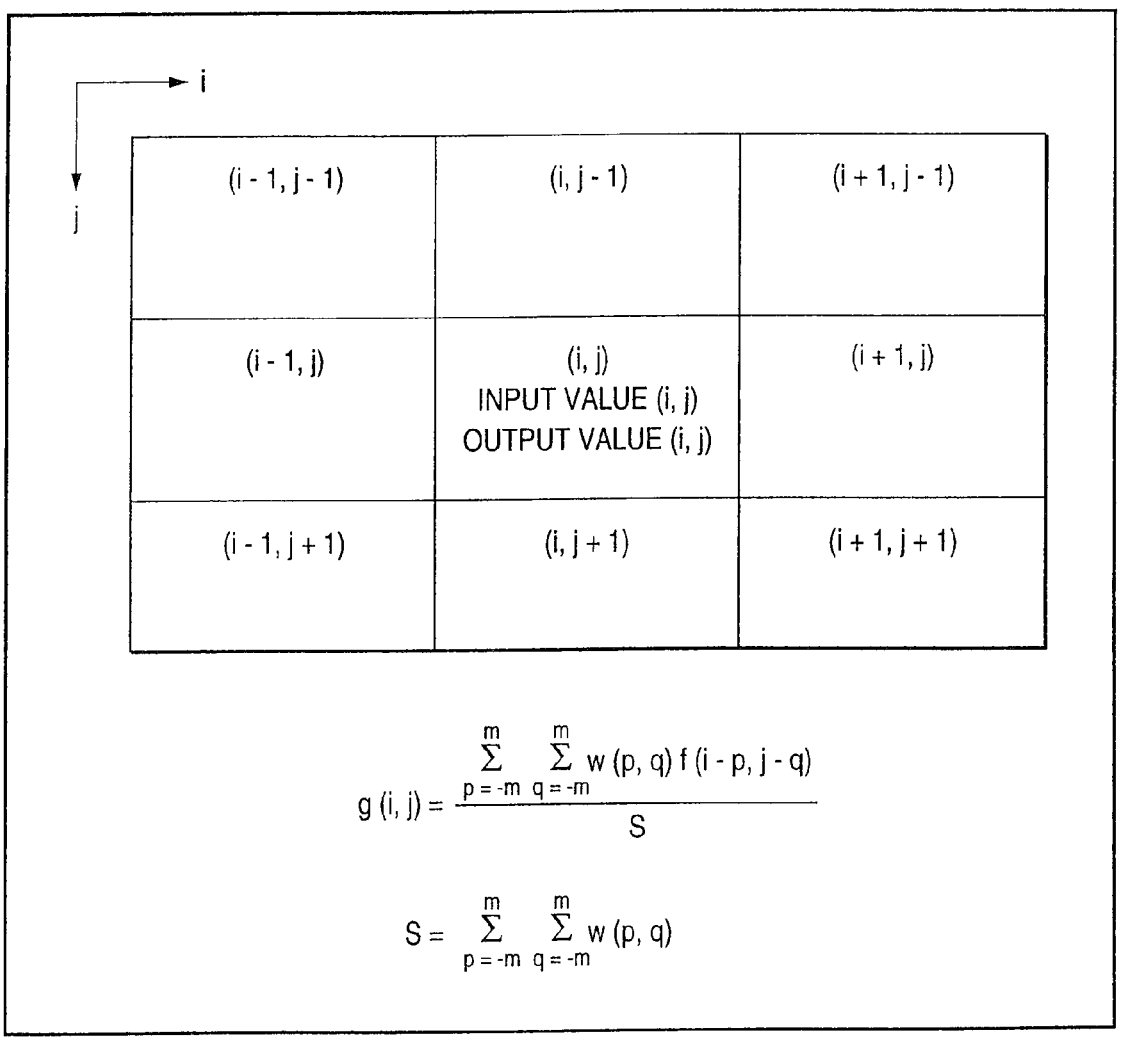
FIG. 13 is an explanatory diagram for explaining "smoothing processing" which is a noise suppression method in the prior art.

Such processing is effective in, for example, a case as concretely stated below, that is, a case where two static images G1 and G2 constituting a dynamic image exist as shown in FIG. 12(a), and where the difference between the images G1 and G2 is taken as shown in FIG. 12(b), images Z1 and Z2 somewhat deviate from each other (in other words, the image Z1 has moved as the image Z2).

The variance $(\sigma^2)^+$ of the above equation (35) corresponds to a variance calculated on the basis of all the pixels x $(=\Omega)$ constituting an image G3 as shown in FIG. 12(b). In this case, however, two peaks $\zeta_1'$ and $\zeta_2'$, for example, ascribable to parts $\zeta_1$ and $\zeta_2$ where the images G1 and G2 are not superposed on each other are caused to appear in a probability distribution diagram concerning the image G3 as shown in FIG. 12(c). Therefore, the variance $(\sigma^2)^+$ is overestimated. It is accordingly inappropriate to use the variance $(\sigma^2)^+$ left intact, for all the static images. On the other hand, as to a part $\zeta_M$ shown in FIG. 12(b), a central peak $\zeta_M'$ in FIG. 12(c) is considered to correspond thereto. It is therefore more preferable to calculate a variance concerning a probability distribution diagram being in a state where the peak $\zeta_M'$ is left by removing the two peaks $\zeta_1'$ and $\zeta_2'$ Such a variance really corresponds to the $(\sigma^2)^{++}$ in the above equation (32).

In other words, the above processing that the average is taken for only the set M of "pixels x as to which the expected values $E[\sigma^2(x)]$ lie within several times the average $(\sigma^2)^+$" is nothing but processing in which an average is taken by extracting only the peak $\zeta_M'$ in FIG. 12(c). As a result, the calculation of the average $(\sigma_2)^{++}$ is equivalent to that of the variance concerning the probability distribution diagram in the state where the peaks $\zeta_1'$ and $\zeta_2'$ have been removed in FIG. 12(c).

In this case, accordingly, the average $(\sigma^2)^{++}$ is substituted into the above equation (5), etc., whereby the more likely values of the transformed pixel values $v'(x)=(v'_1(x), v'_2(x), \ldots, v'_K(x))$ concerning the respective pixels $x_1, \ldots,$ and $x_F$ can be obtained.

Incidentally, regarding the estimation of noises, in general, a method is also effective wherein a subject of uniform brightness is put at a position which is to lie, e.g., at the corner of an image, and the distribution of the values of a set of pixels at the corresponding part is measured, thereby to estimate the distribution of the noises.

In the present invention, the method of estimating the distribution or variance of noises may fundamentally be based on any scheme, and it is not restricted to several schemes stated here. In practice, a scheme is to be properly adopted wherein the distribution or variance can be most preferably calculated using empirical information, an imaging process theory, measurement values or actually measured values, etc. available in each of various embodiments. Incidentally, on this occasion, it is favorable for simplifying the construction of an apparatus and enhancing a processing speed that the estimation method is constructed as easily as possible, in conformity with a practical precision required in each embodiment.

(X-4 Further Embodiments of Present Invention)

Lastly, supplementary description will be made on further embodiments of the present invention as have not been referred to in the foregoing.

(X-4-1 Embodiment as Preprocessing of Data Compression)

In general, when an image Q' in which random noises are added to a certain image Q is created, the image Q' has a much larger information content as compared with the image Q (an exception is a case where the original image Q contains very large noises). Accordingly, if such an image Q' is to be communicated or to be recorded on a recording medium, an information content for describing the noises having no substantial significance uses the number of bits in the communications or recording wastefully. Conversely speaking, when an image Q" with the noises suppressed is created from the image Q' and is handled for the communications or recording, an image having the same significance (and being vivid) can be expressed with a small information content.

In general, in case of handling an image in communications or recording, the image is often subjected to so-called "compression processing". This processing is intended to reduce an information content to-be-transmitted or -recorded to the utmost, thereby to realize high-speed communications or large-quantity recording (for one recording medium). In practical use, it is in the case of a "dynamic image" that the information content is to be especially reduced. These are facts which are extensively known in irreversible image compression technology.

In view of these items, the number of bits (the information content) necessary for the communications or recording can be made smaller by compressing the image Q" with the noises suppressed, rather than by compressing the image Q' containing the noises.

Therefore, when the image Q' to be communicated or recorded is subjected to preprocessing for suppressing the noises by applying the coherent filter according to the present invention (concretely, a "preprocessing apparatus" is constructed by hardware or software, and the same applies below), the image Q" with the noises suppressed is obtained without spoiling a temporal resolution or a spatial resolution, and this image Q" can be compressed at a high compression rate, whereby a time period and a memory capacity necessary for the communications or recording can be sharply saved.

(X-4-2 Embodiment as Preprocessing of Two-Dimensional or Three-Dimensional Regional Extraction Processing)

Processing for extracting specified regions from the two-dimensional image of an aerial photograph or the like or from the three-dimensional distribution image based on the MRI equipment or the like, is often executed. By way of example, the regions of only roads are extracted regarding the former aerial photograph, while the regions of only blood vessels are extracted regarding the latter three-dimensional distribution image of a human head as based on the MRI equipment or the like, and the extracted regions are subjected to rendering so as to display them as computer graphics. Especially, the blood vessels in the latter can be relatively rotated or observed in various directions by way of example, and the radiography thereof is recognized as important technology in the diagnoses of a cerebrovascular disease, etc.

In case of such regional extraction, the simplest and most fundamental processing is so-called "threshold processing". The threshold processing is processing in which individual pixels x constituting the two-dimensional image or three-dimensional distribution image, or the like are classified, depending upon if their scalar values are larger than a certain predetermined threshold value. Besides, when a set of pixels consisting of only the pixels x which fall within a specified class is subjected to rendering, an image having undergone the regional extraction, for example, a "three-dimensional image consisting of only blood vessels" can be displayed (incidentally, various schemes other than the "threshold processing" have also been used as prior-art techniques).

Meanwhile, in such regional extraction processing, it is desirable that noises are little contained in the original image (two-dimensional image or three-dimensional distribution image mentioned above, or the like). This is because the state occurs that, when noises exist in the image, a pixel which lies in a place which ought not to be, for example, a blood vessel has a pixel value as if it were the blood vessel, whereas a pixel which lies in a place which ought to be blood vessel has a pixel value as if it were not the blood vessel. In this state, accordingly, the step of removing such a pixel erroneously classified needs to be performed by complicated postprocessing. Besides, in the actual situation, the "smoothing processing" as stated in the section of the prior art is generally performed in order to eliminate the noises on the original image. In this case, however, there is the problem that a spatial resolution is spoilt, so the fine structure of the region to-be-extracted (including, for example, fine blood vessels) are lost.

Therefore, when the original image, namely, the two-dimensional image or three-dimensional distribution image, is subjected to preprocessing for suppressing the noises by applying the coherent filter according to the present invention, the noises of the image can be suppressed without spoiling the spatial resolution, with the result that precise regional extraction processing can be carried out.

Incidentally, the embodiment similar to such extraction processing has already been described in the foregoing section "Case of Constructing Pixel value v(x) from Single image" (refer to FIG. 8(c)).

What is claimed is:

1. An image processing apparatus comprising:
decision means for deciding a similarity between a first pixel and a second pixel which constitute an image, by testing, the similarity between the first pixel and the second pixel being decided by use of a result of comparison between a vector value obtained by arraying scalar values which the first pixel takes in an image of an object photographed by an imaging apparatus and a vector value obtained by arraying scalar values which the second pixel takes in the image of the object; and
average means for subjecting the first pixel and the second pixel to weighted averaging on a basis of a decided result by the decision means,
wherein the average means multiplies a value of the second pixel value by a large weighting factor by the multiplication means when the similarity between the first pixel and the second pixel is high, and multiplies the value of the second pixel by a small weighting factor when the similarity is low, and the average means subjects weighted values of the first pixel and the second pixel to the weighted averaging.

2. An image processing apparatus as defined in claim 1, wherein the average means obtains a new pixel value concerning the first pixel, by weighted averaging.

3. An image processing apparatus as defined in claim 1, wherein the average means includes determination means for determining a weighting factor on a basis of the decided result, and multiplication means for multiplying values of the first pixel and the second pixel by the weighting factor.

4. An image processing apparatus as defined in claim 1, wherein the decision means decides the similarity between the first pixel and the second pixel on a basis of a plurality of images which imaging equipment produces by photographing an identical subject at different times.

5. An image processing apparatus as defined in claim 4, wherein the decision means decides the similarity between the first pixel and the second pixel on the basis of a plurality of images which imaging equipment produces by photographing an identical subject under different photographing conditions.

6. An image processing apparatus as defined in claim 1, wherein the decision means decides the similarity between the first pixel and the second pixel on the basis of a plurality of images which imaging equipment produces by photographing an identical subject under different photographing conditions.

7. An image processing apparatus as defined in claim 1, wherein the decision means decides the similarity between the first pixel and the second pixel on the basis of a plurality of images which imaging equipment produces by processing an image of an identical subject under different processing conditions.

8. An image processing apparatus as defined in claim 1, further comprising image average means for averaging a first image obtained by subjecting the image to averaging processing performed by the average means, and a second image obtained by subjecting the image to processing different from the averaging processing.

9. An image processing apparatus as defined in claim 1, further comprising image average means for averaging a first image obtained by subjecting the image to averaging processing performed by the average means, and a second image which is an original image not subjected to the averaging processing.

10. An image processing apparatus comprising:

decision means for deciding a similarity between a first pixel and a second pixel which constitute an image, by testing, the similarity between the first pixel and the second pixel being decided by use of a result of comparison between a vector value obtained by arraying scalar values which the first pixel takes in an image of an object photographed by an imaging apparatus and a vector value obtained by arraying scalar values which the second pixel takes in the image of the object;

average means for subjecting the first pixel and the second pixel to weighted averaging on a basis of a decided result by the decision means; and numerical means for numerically giving a similarity between a first pixel and a second pixel which constitute an image, by statistical testing, wherein the average means averages values of the first pixel and the second pixel when the similarity between the first pixel and the second pixel is high, and does not average the values of the first pixel and second pixel when the similarity is low.

11. An image processing apparatus comprising:

decision means for deciding a similarity between a first pixel and a second pixel which constitute images, by testing, the similarity between the first pixel and the second pixel of predetermined ones of the images being decided by use of a result of comparison between a first vector obtained by arraying corresponding pixel values of a plurality of images in coordinates of the first pixel and a second vector obtained by arraying corresponding pixel values of the images in coordinates of the second pixel;

average means for subjecting the first pixel and the second pixel to weighted averaging on the basis of a decided result by the decision means; and numerical means for numerically giving a similarity between a first pixel and a second pixel which constitute an image, by statistical testing, wherein the average means averages values of the first pixel and the second pixel when the similarity between the first pixel and the second pixel is high, and does not average the values of the first pixel and second pixel when the similarity is low.

12. An image processing apparatus as defined in claim 11, further comprising image average means for averaging a first image obtained by subjecting the image to averaging processing performed by the average means, and a second image obtained by subjecting the image to processing different from the averaging processing.

13. An image processing apparatus as defined in claim 11, further comprising image average means for averaging a first image obtained by subjecting the image to averaging processing performed by the average means, and a second image which is an original image not subjected to the averaging processing.

* * * * *